(12) United States Patent
Chamberlain et al.

(10) Patent No.: US 12,105,361 B2
(45) Date of Patent: Oct. 1, 2024

(54) MYOPIA-CONTROL CONTACT LENSES AND METHODS RELATING THERETO

(71) Applicant: CooperVision International Limited, Fareham (GB)

(72) Inventors: Paul Chamberlain, Livermore, CA (US); Baskar Arumugam, Dublin, CA (US); Martin Webber, Southampton (GB); Arthur Bradley, Bloomington, IN (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 493 days.

(21) Appl. No.: 17/547,339

(22) Filed: Dec. 10, 2021

(65) Prior Publication Data
US 2022/0197060 A1  Jun. 23, 2022

Related U.S. Application Data

(60) Provisional application No. 63/127,242, filed on Dec. 18, 2020.

(51) Int. Cl.
*G02C 7/06* (2006.01)
*G02C 7/02* (2006.01)

(52) U.S. Cl.
CPC .............. *G02C 7/061* (2013.01); *G02C 7/024* (2013.01); *G02C 2202/24* (2013.01)

(58) Field of Classification Search
CPC .................................. G02C 7/061; G02C 7/024
(Continued)

(56) References Cited

U.S. PATENT DOCUMENTS

| | | |
|---|---|---|
| 5,652,638 A | 7/1997 | Roffman et al. |
| 5,861,935 A | 1/1999 | Morris et al. |

(Continued)

FOREIGN PATENT DOCUMENTS

| | | |
|---|---|---|
| AU | 2020101479 A4 | 8/2020 |
| CN | 1224508 A | 7/1999 |

(Continued)

OTHER PUBLICATIONS

Office Action issued in corresponding Taiwan Patent Application No. 110147339 dated Sep. 15, 2022 (with English translation)(7 pages).

(Continued)

*Primary Examiner* — James R Greece
(74) *Attorney, Agent, or Firm* — Kilyk & Bowersox, P.L.L.C.

(57) ABSTRACT

A contact lens for use in preventing or slowing the development or progression of myopia, and methods relating thereto, are described. The lens includes an optic zone comprising a central region having a first optical axis, and a curvature providing a base power, and centred on a centre of curvature that is on the first optical axis. The optic zone comprises an annular region, wherein the annular region surrounds the central region. The annular region comprises at least one maximum add power meridian having a curvature providing a maximum add power, and centred on a centre of curvature that is a first distance from the first optical axis. The annular region comprises at least one intermediate add power meridian, having a curvature providing an intermediate add power of between zero dioptres of add power and the maximum add power, and centred on a centre of curvature that is a different distance from the optical axis than the first distance.

15 Claims, 25 Drawing Sheets

(58) Field of Classification Search
USPC .................................................. 351/159.42
See application file for complete search history.

(56) References Cited

U.S. PATENT DOCUMENTS

| | | |
|---|---|---|
| 2008/0062380 A1 | 3/2008 | Phillips |
| 2011/0279912 A1 | 11/2011 | Fiala |
| 2012/0320333 A1 | 12/2012 | Holden et al. |
| 2013/0182216 A1 | 7/2013 | Ho et al. |
| 2014/0104563 A1 | 4/2014 | Bakaraju et al. |
| 2015/0124212 A1 | 5/2015 | Loertscher et al. |
| 2016/0377884 A1* | 12/2016 | Lau .................. G02C 7/041 351/159.05 |
| 2017/0010477 A1 | 1/2017 | Verburg et al. |
| 2017/0115509 A1 | 4/2017 | Brennan et al. |
| 2017/0276961 A1 | 9/2017 | Wooley et al. |
| 2017/0276962 A1 | 9/2017 | Zhao |
| 2018/0024380 A1* | 1/2018 | Vu .................. G02C 7/042 351/159.06 |
| 2018/0275427 A1 | 9/2018 | Lau et al. |
| 2019/0227342 A1 | 7/2019 | Brennan et al. |
| 2020/0183185 A1 | 6/2020 | Sankaridurg et al. |
| 2020/0341297 A1 | 10/2020 | Shi et al. |
| 2021/0311326 A1 | 10/2021 | Wyss et al. |
| 2021/0341757 A1* | 11/2021 | Webber .................. G02C 7/06 |
| 2021/0369445 A1* | 12/2021 | Chiu .................. A61F 2/164 |
| 2022/0133469 A1* | 5/2022 | Liu .................. A61F 2/1654 623/6.3 |

FOREIGN PATENT DOCUMENTS

| | | |
|---|---|---|
| CN | 102906631 A | 1/2013 |
| CN | 103118627 A | 5/2013 |
| CN | 106461971 A | 2/2017 |
| CN | 107219640 A | 9/2017 |
| CN | 108205208 A | 6/2018 |
| CN | 110785149 A | 2/2020 |
| CN | 111830731 A | 10/2020 |
| EP | 4172687 A1 | 5/2023 |
| JP | H0915541 A | 1/1997 |
| JP | 2005242346 A | 9/2005 |
| JP | 2017219835 A | 12/2017 |
| JP | 2019211789 A | 12/2019 |
| TW | 202032210 A | 9/2020 |
| WO | 0203126 A1 | 10/2002 |
| WO | 2009017403 A1 | 2/2009 |
| WO | 2010129465 A1 | 11/2010 |
| WO | 2014198972 A1 | 12/2014 |
| WO | 2015050455 A1 | 4/2015 |
| WO | 2022096932 A1 | 5/2022 |

OTHER PUBLICATIONS

Office Action issued in corresponding Chinese Patent Application No. 202180058405.9 issued Jul. 22, 2023 (with English translation)(14 pages).
International Preliminary Report on Patentability issued in corresponding International Patent Application No. PCT/GB2021/053337 mailed Nov. 16, 2022 (16 pages).
Office Action issued in corresponding Japanese Patent Application No. 2023-506500 mailed Nov. 1, 2023 (with English translation)(4 pages).
Search and Examination Report issued in corresponding United Kingdom Patent Application No. GB2118306.9 dated Jun. 7, 2022 (9 pages).
International Search Report and Written Opinion issued in corresponding International Patent Application No. PCT/GB2021/053337 mailed Apr. 4, 2022 (16 pages).
Extended European Search Report in corresponding European Patent Application No. 21153765.9 dated Jul. 16, 2021 (10 pages).
Examination Report issued in corresponding United Kingdom Patent Application No. GB2118306.6 dated Mar. 22, 2024 (4 pages).
Office Action issued in corresponding Japanese Patent Application No. 2023-506500 mailed Jun. 24, 2024 (with English translation)(9 pages).

* cited by examiner

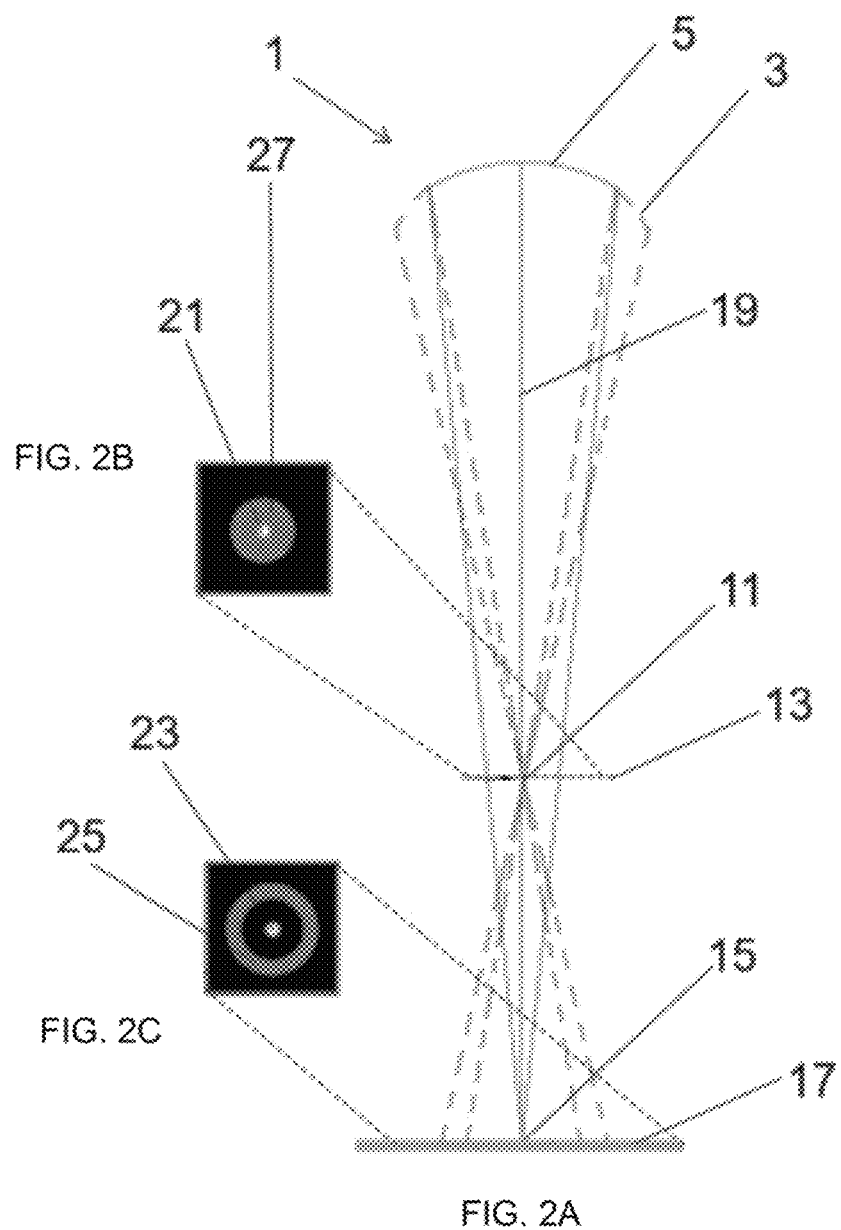

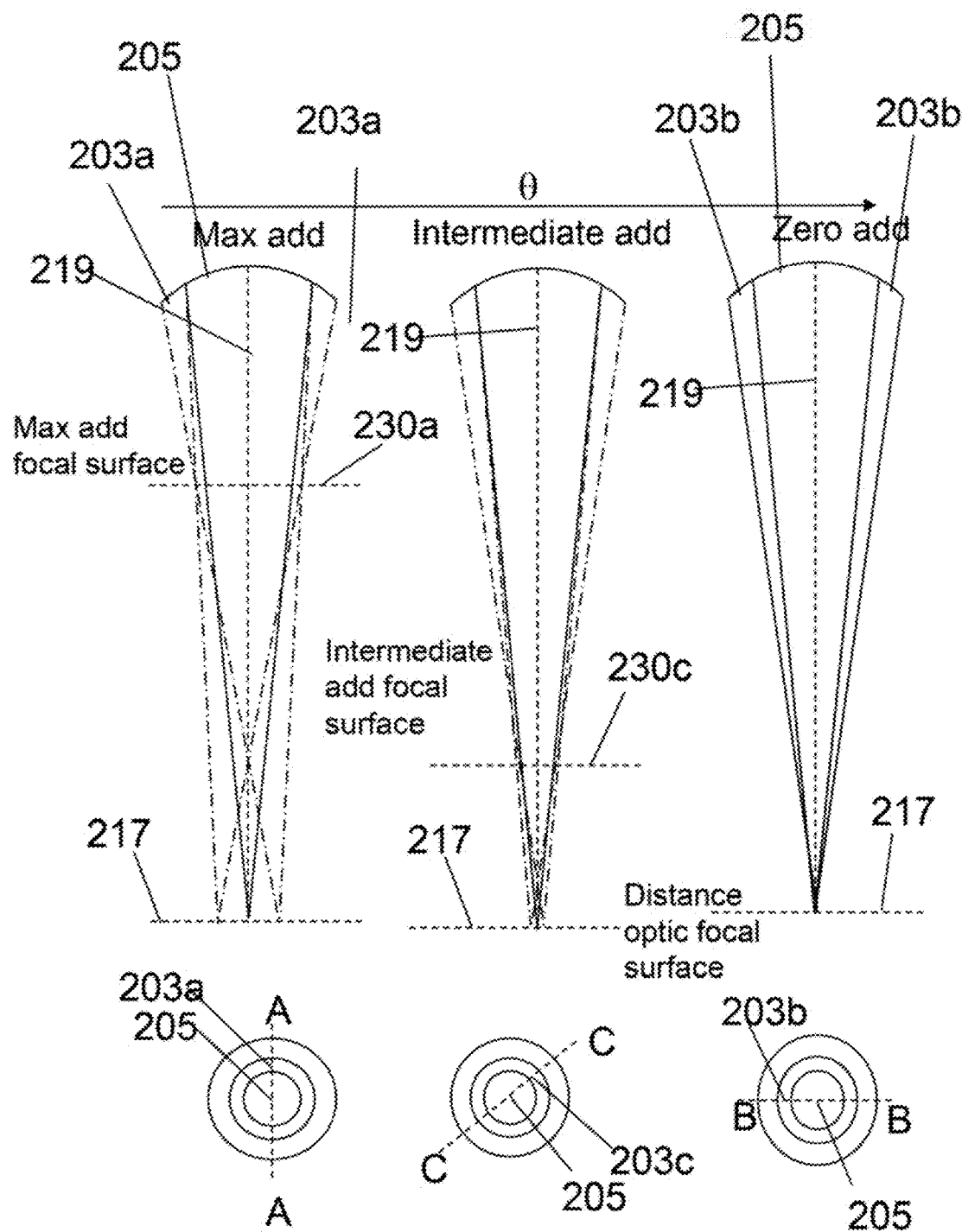

nθ

MYOPIA-CONTROL CONTACT LENSES AND METHODS RELATING THERETO

This application claims the benefit under 35 U.S.C. § 119(e) of prior U.S. Provisional Patent Application No. 63/127,242, filed Dec. 18, 2020, which is incorporated in its entirety by reference herein.

The present disclosure concerns contact lenses for use in preventing or slowing the development or progression of myopia. The present disclosure also concerns methods of manufacturing such lenses and methods of using such lenses. In addition, the present disclosure relates to certain contact lenses and methods for providing improved visual contrast.

BACKGROUND

Myopia (short-sightedness) affects a significant number of people including children and adults. Myopic eyes focus incoming light from distant objects to a location in front of the retina. Consequently, the light diverges towards, and is out of focus upon arrival at the retina. Conventional lenses (e.g., spectacle lenses and contact lenses) for correcting myopia cause divergence of incoming light from distant objects before it reaches the eye, so that the location of the focus is shifted onto the retina.

It was suggested several decades ago that progression of myopia in children or young people could be slowed or prevented by under-correcting, i.e. moving the focus towards but not quite onto the retina. However, that approach necessarily results in degraded distance vision compared with the vision obtained with a lens that fully corrects for any myopia. Moreover, it is now regarded as doubtful that under-correction is effective in controlling developing myopia. A more recent approach is to provide lenses having both regions that provide full correction of distance vision and regions that under-correct, or deliberately induce, myopic defocus. It has been suggested that this approach can prevent or slow down the development or progression of myopia in children or young people, whilst providing good distance vision. The regions that provide full-correction of distance vision are usually referred to as base-power regions and the regions that provide under-correction or deliberately induce myopic defocus are usually referred to as add-power regions or myopic defocus regions (because the dioptric power is more positive, or less negative, than the power of the distance regions).

A surface (typically the anterior surface) of the add-power region(s) has a smaller radius of curvature than that of the distance power region(s) and therefore provides a more positive or less negative power to the eye. The add-power region(s) are designed to focus incoming parallel light (i.e. light from a distance) within the eye in front of the retina (i.e. closer to the lens), whilst the distance power region(s) are designed to focus light and form an image at the retina (i.e. further away from the lens).

Another type of contact lens that reduces the progression of myopia is a dual-focus contact lens, available under the name of MISIGHT (CooperVision, Inc.). This dual-focus lens is different than bifocal or multifocal contact lenses configured to improve the vision of presbyopes, in that the dual-focus lens is configured with certain optical dimensions to enable a person who is able to accommodate to use the distance correction (i.e., the base power) for viewing both distant objects and near objects. The treatment zones of the dual-focus lens that have the add-power also provide a myopically defocused image at both distant and near viewing distances.

Whilst these lenses have been found to be beneficial in preventing or slowing down the development or progression of myopia, annular add-power regions can give rise to unwanted visual side effects. Light that is focused by the annular add-power regions in front of the retina diverges from the focus to form a defocused annulus at the retina. Wearers of these lenses therefore may see a ring or 'halo' surrounding images that are formed on the retina, particularly for small bright objects such as street lights and car headlights. Also, rather than using the natural accommodation of the eye (i.e. the eye's natural ability to change focal length) to bring nearby objects into focus, wearers can make use of the additional focus in front of the retina that results from the annular add-power region; in other words, wearers can inadvertently use the lenses in the same manner as presbyopia correction lenses are used, which is undesirable for young subjects.

Further lenses have been developed which can be used in the treatment of myopia, and which are designed to eliminate the halo that is observed around focused distance images in the MISIGHT (CooperVision, Inc.) lenses and other similar lenses described above. In these lenses, the annular region is configured such that no single, on-axis image is formed in front of the retina, thereby preventing such an image from being used to avoid the eye accommodating to near targets. Rather, distant point light sources are imaged by the annular region to a ring-shaped focal line at a near add power focal surface, leading to a small spot size of light, without a surrounding 'halo' effect, on the retina at a distance focal surface.

The present disclosure provides improved lenses for use in young subjects that prevent or slow worsening of myopia.

SUMMARY

The present disclosure provides, according to a first aspect, a contact lens for use in preventing or slowing the development or progression of myopia. The lens includes an optic zone. The optic zone comprises a central region, the central region having a first optical axis and a curvature providing a base power and centred on a centre of curvature that is on the first optical axis. The optic zone comprises an annular region, wherein the annular region surrounds the central region. The annular region comprises at least one maximum add power meridian having a curvature providing the maximum add power and centred on a centre of curvature that is a first distance from the first optical axis. The annular region comprises at least one intermediate add power meridian having a curvature providing an intermediate add power of between zero dioptres of add power and the maximum add power and centred on a centre of curvature that is at a different distance from the optical axis than the first distance.

The present disclosure provides, according to a second aspect, a method of manufacturing a contact lens according to the first aspect. The method comprises forming a contact lens. The contact lens comprises a central region, the central region having a base power, and an annular region, wherein the annular region surrounds the central region. The annular region comprises at least one maximum add power meridian having a curvature providing a maximum add power and centred on a centre of curvature that is a first distance from the first optical axis. The annular region comprises at least one intermediate add power meridian having a curvature providing an intermediate add power of between zero dioptres of add power and the maximum add power, and centred on a centre of curvature that is at a different distance from the optical axis than the first distance.

The present disclosure provides, according to a third aspect, a method of reducing progression of myopia. The method comprises providing a multifocal ophthalmic lens according to the first aspect to a myopic person who is able to accommodate for varying near distances.

It will of course be appreciated that features described in relation to one aspect of the present disclosure may be incorporated into other aspects of the present disclosure. For example, the method of the disclosure may incorporate features described with reference to the apparatus of the disclosure and vice versa.

DESCRIPTION OF THE DRAWINGS

Example embodiments will now be described, by way of example only, with reference to the accompanying schematic drawings.

FIG. 2A is a ray diagram for the lens of FIGS. 1A-B;

FIG. 2B shows a light pattern at a proximal focal surface of the lens of FIG. 1A formed from a distant point source;

FIG. 2C shows a light pattern at a distal focal surface of the lens of FIG. 1A formed from a distant point source;

FIG. 7A is a ray diagram for the lens of FIG. 5A showing light rays intersecting the lens along a line A-A;

FIG. 7B is a ray diagram for the lens of FIG. 5A showing light rays that intersect the lens along a line C-C;

FIG. 7C is a ray diagram for the lens of FIG. 5A showing light rays that intersect the lens along a line B-B;

DETAILED DESCRIPTION

Figure 1A:
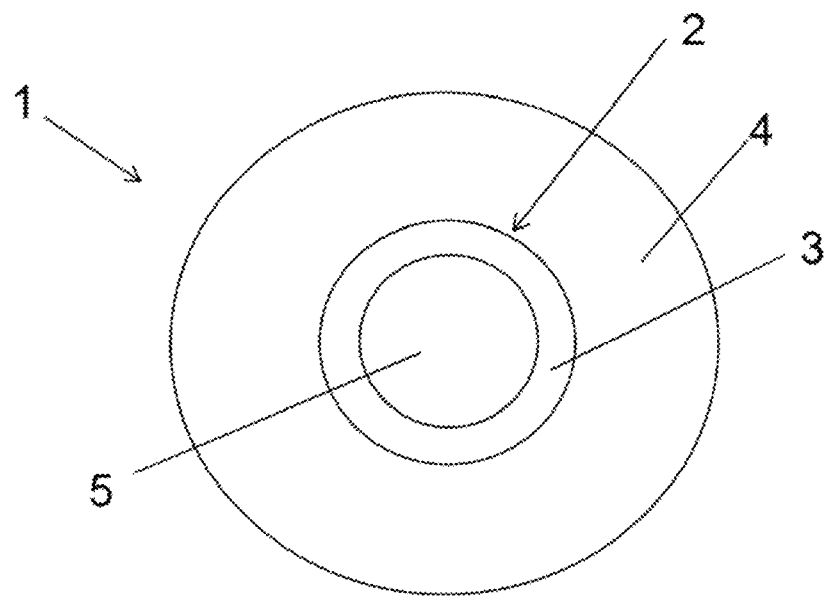
FIG. 1A is a schematic top view of a contact lens that uses a treatment zone that provides a myopically defocused image to reduce the progression of myopia.

According to a first aspect, the present disclosure provides a contact lens for use in preventing or slowing the development or progression of myopia. The lens includes an optic zone comprising a central region, the central region having a first optical axis and a curvature providing a base power, and centred on a centre of curvature that is on the first optical axis. The optic zone comprises an annular region, wherein the annular region surrounds the central region. The annular region comprises at least one maximum add power meridian having a curvature providing a maximum add power and centred on a centre of curvature that is a first distance from the first optical axis; and at least one intermediate add power meridian having a curvature providing an intermediate add power of between zero dioptres of add power and the maximum add power, and centred on a centre of curvature that is a different distance from the optical axis than the first distance.

As used herein, the term contact lens refers to an ophthalmic lens that can be placed onto the anterior surface of the eye. It will be appreciated that such a contact lens will provide clinically acceptable on-eye movement and not bind to the eye or eyes of a person. The contact lens may be in the form of a corneal lens (e.g., a lens that rests on the cornea of the eye). The contact lens may be a soft contact lens, such as a hydrogel contact lens or a silicone hydrogel contact lens.

A contact lens according to the present disclosure comprises an optic zone. The optic zone encompasses parts of the lens that have optical functionality. The optic zone is configured to be positioned over the pupil of an eye when in use. For contact lenses according to the present disclosure, the optic zone comprises the central region, and the annular region that surrounds the central region. The optic zone is surrounded by a peripheral zone. The peripheral zone is not part of the optic zone, but sits outside the optic zone and above the iris when the lens is worn, and it provides mechanical functions, for example, increasing the size of the lens thereby making the lens easier to handle, providing ballasting to prevent rotation of the lens, and/or providing a shaped region that improves comfort for the lens wearer. The peripheral zone may extend to the edge of the contact lens.

A contact lens according to an embodiment of the disclosure may include a ballast to orient the lens when positioned on the eye of a wearer. Embodiments of the disclosure incorporating a ballast into the contact lens will, when placed on the eye of a wearer, rotate under the action of the wearer's eyelid to a pre-determined angle of repose; for example, the ballast may be a wedge and the rotation may result from the action of the eyelid on the wedge. It is well-known in the art to ballast a contact lens to orient a contact lens; for example, toric contact lenses are ballasted to orient the lens so that the orthogonal cylindrical corrections provided by the lens align correctly for the astigmatism of the wearer's eye. It may be that the contact lens of the present disclosure provides particular benefit to the wearer in a given orientation. For example, the contact lens may provide particular benefit to the wearer when a maximum add power meridian is in a particular orientation.

The contact lens may be substantially circular in shape and have a diameter from about 4 mm to about 20 mm. The optic zone may be substantially circular in shape and may have a diameter from about 2 mm to about 10 mm. In some embodiments, the contact lens has a diameter from 13 mm to 15 mm, and the optic zone has a diameter from 7 mm to 9 mm.

The first optic axis may lie along the centreline of the lens. The central region may focus light from a distant point object, on the first optical axis, to a spot on the first optical axis at a distal focal surface. The term surface, as used herein, does not refer to a physical surface, but to a surface that could be drawn through points where light from distant objects would be focused. Such a surface is also referred to as an image plane (even though it can be a curved surface) or image shell. The eye focuses light onto the retina which is curved, and in a perfectly focused eye, the curvature of the image shell would match the curvature of the retina. Therefore the eye does not focus light onto a flat mathematical plane. However, in the art, the curved surface of the retina is commonly referred to as a plane.

Light rays from a distant point source that pass through the at least one maximum add power annular meridian may be focused away from the first optical axis on a maximum add power focal surface. Light rays that pass through the central region will form an on-axis blur circle at the max add power focal surface. Light rays from a distant point source that pass through the at least one maximum add power annular region may be focused outside the blur circle.

The central region of the lens has the base power. The annular region of the lens has an add power, and the net near power of the annular region is the sum of the base power and the add power.

The base power of the lens may be positive, and the at least one maximum add power region may have a power that is more positive than the base power. In this case, the maximum add power focal surface will be closer to the lens than the distal focal surface. An on-axis image will not be formed by light passing through the at least one maximum add power meridians. A wearer of the lens will therefore need to use the natural accommodation of their eye to bring nearby objects into focus. It may be that the light rays focused by the at least one maximum add power meridian do not intersect with the first optical axis of the contact lens at all, or not until after they have passed the maximum add power focal surface.

The base power of the lens may be negative, and the at least one maximum add power region may have a power that is less negative than the power of the base region, or the add power region may have a positive power. Considering the lens positioned on the cornea, if the power of the maximum add power region is less negative than the base power, a maximum add power focal surface will be more anterior in the eye than the distal focal surface. Considering the lens when it is not positioned on the cornea, if the power of the maximum add power region is positive, a maximum add power focal surface will be on the opposite (image) side of the lens than the distal focal surface (which will be a virtual focal surface on the object side of the lens); if the power of the maximum add power region is negative (but less negative than the base power), a virtual maximum add power focal surface will be further from the lens than a virtual distal focal surface.

Light rays from a distant point source that pass through the at least one intermediate add power annular meridian may be focused at an intermediate add power focal surface. For a lens that has a positive base power and at least one intermediate add power meridian that has a more positive power than the base power, the intermediate add power focal surface will be closer to the lens than the distal focal surface but further from the lens than the maximum add power focal surface. An on-axis image will also not be formed by light passing through the at least one intermediate add power meridians. It may be that the light rays focused by the at least one intermediate add power meridian do not intersect with the first optical axis of the contact lens at all, or not until after they have passed the intermediate and max add power focal surfaces. Considering a lens positioned on the cornea, if the lens has a negative base power, and at least one intermediate add power region having a less negative power than the base power, an intermediate add power focal surface will be closer to the lens than the distal focal surface, but further away than the maximum add power focal surface. Considering a lens not positioned on the cornea, if the lens has a negative base power and at least one intermediate add power region having a less negative power than the base power, a virtual add power focal surface will be further from the lens than the virtual distal focal surface, but closer than the virtual maximum add power focal surface.

For a lens having a positive base power, the at least one maximum add power region will have a greater curvature than the curvature providing the base power. In this case, the radius of curvature of the at least one maximum add power meridian will be smaller than the radius of curvature of the central region. The centre of curvature of the at least one maximum add power meridian may be closer to the lens than the centre of curvature of the central region. For a lens having a negative base power, the at least one maximum add power region may have a smaller curvature than the curvature providing the base power. In this case, the radius of curvature of the at least one maximum add power meridian will be larger than the radius of curvature of the central region.

The at least one intermediate add power meridian may have a curvature that is in between the curvature of the at least one maximum add power region and the curvature of the central region. In this case, the radius of curvature of the at least one intermediate meridian will be smaller than the radius of curvature of the central region but larger than the radius of curvature of the at least one maximum add power meridian. The centre of curvature of the at least one intermediate add power meridian may be closer to the lens than the centre of curvature of the central region but further from the lens to the centre of curvature of the at least one maximum add power meridian.

Light rays from a distant point source that pass through the annular region do not form a single focused image at a focal surface in front of the retina. As a result of the varying add power around the circumference of the annular region, light rays from a distant point source that pass through the annular region form a focused annular waveform. The waveform varies in three dimensions, so that the distance from the lens to the local focus of the waveform varies about the axis of the lens; thus, the defocus varies about the axis of the lens. When the lens is provided on an eye, different parts of the retina will be exposed to different amounts of defocus as a result of the varying add power of the annular region. A lens that gives rise to varying amounts of defocus across the retina, in particular a periodically varying defocus, may be more effective in slowing the growth of myopia than a lens with a constant myopic defocus.

The central region may focus light from a distant point object to a spot on the first optical axis at a distal focal surface. The at least one maximum add power meridian and the at least one intermediate power meridian may direct light from distant point objects towards the spot. Light from a distant point object that passes through the annular region may give rise to varying levels of blurring at a distal focal surface, as a result of the varying add power of the annular region. A meridionally varying blur pattern may be produced by light from a distant point source passing through the annular region, with the pattern being dependent upon the arrangement of add power meridians, including the at least one maximum add power meridian and the at least one intermediate add power meridian, The annular region may limit spreading of off-axis light at the distal focal surface, for example by acting as an optical beam stop, which may improve the optical contrast of images generated by the lens.

By reducing the spread of light at the distal focal surface, it is possible to improve the visual contrast observed by the lens wearer compared to lens designs such as those illustrated in FIG. 1. Thus, with the present lenses and methods, it is possible to achieve a desired slowing of progression of myopia while enhancing image contrast and image quality compared to existing contact lenses suitable for reducing the progression of myopia.

The annular region may further comprise at least one base power meridian, having the curvature providing the base power and centred on the centre of curvature of the central region. Alternatively, the add power of the annular region may vary between an intermediate add power and a maximum add power (i.e. a base power meridian may not be present). The add power of the annular region may be more positive, or less negative, than the base power for all meridians.

The at least one base power meridian may focus light from a distant point object to a spot on the first optical axis at a distal surface. The spot may coincide with the spot formed by light passing through the central region.

The curvatures providing the base power, the maximum add power, and the intermediate add power may be curvatures of the anterior surface of the lens. The curvatures providing the base power, the maximum add power, and the intermediate add power may be curvatures of the posterior surface of the lens. The curvatures providing the base power, the maximum add power, and the intermediate add power may be curvatures of the anterior surface and the posterior surface of the lens providing a combined effect.

The power of the lens can be defined as a sagittal, or slope-based power. Slope-based power Ps is a function of the first derivative of the wavefront and varies with the slope of the wavefront. The annular region of the lens may be tilted relative to the central region and, because sagittal power is a function of the slope of a lens surface, the tilt of the annular region relative to the central region gives rise to a sagittal power that is a ramp starting more negative than the power at the inner edge of the annular region and increasing with increasing radius to a power less negative than the power at the outer edge of the annular region.

The annular region may be tilted radially relative to the central region, by different amounts at different meridians, in order to match the sagittal power at the midpoint of the annular region at each meridian to the power that the central region would have it were extended out to the midpoint. The lens may have a sagittal power at the midpoint of the annular region in the at least one maximum add power meridian that matches the power that the central region would have if it were extended out to the midpoint. The lens may have a sagittal power at the midpoint of the annular region in at least one intermediate add power meridian that matches the power that the central region would have if it were extended out to the midpoint.

The annular region may comprise a periodic arrangement of maximum add power meridians separated by intermediate add power meridians. The add power of the annular region may vary continuously between the maximum add power meridians and the intermediate add power meridians. The add power of the annular region may be more positive, or less negative, than the base power for all meridians. The annular region may comprise a repeating periodic arrangement of maximum add power meridians, intermediate add power meridians and base power meridians. The add power of the annular region may vary continuously between the maximum add power meridians, the intermediate add power meridians, and the base power meridians. The position around the circumference of the lens may be defined by an angle θ of between 0 and 360°, with a line along θ=180° lying along the diameter of the lens. The annular region may comprise maximum add power meridians coinciding with θ=0° and θ=180°. The annular region may comprise maximum add power meridians coinciding with θ=0°, 90°, 180° and 270°, or any other angle. The annular region may comprise maximum add power meridians every 10°, every 20° or every 30° around the circumference of the lens. Alternatively, the annular region may comprise an aperiodic arrangement of maximum add power meridians around the circumference of the lens. If a plurality of maximum add power meridians are present each maximum add power meridian may have the same power or they may have different powers. If a plurality of maximum add power meridians are present, they may be arranged at irregular intervals around the circumference of the annular region. Each of the at least one maximum add power meridians may have a symmetric power profile or an asymmetric power profile. The power profile of the annular region may be symmetric or asymmetric in between maximum add power meridians.

The power of the annular region may vary in a sinusoidal manner around the circumference of the annular region. The power of the annular region may vary in a stepwise manner around the circumference of the annular region. The power of the annular region may vary in a triangular or sawtooth manner around the circumference of the annular region. The power of the annular region may vary between the power of the at least one maximum add power meridian and base power, or between the power of the at least one maximum add power meridian and the power of the at least one intermediate add power meridian. The periodicity of the variation may be 180°, 90°, 45°, or 30°, for example.

The central region may be substantially circular in shape and may have diameter of between about 2 and 9 mm, and preferably may be between 2 and 7 mm. The central region may be substantially elliptical in shape. The annular region may extend radially outwards from a perimeter of the central region by between about 0.1 to 4 mm, preferably between about 0.5 and 1.5 mm. For example, the radial width of the annular region may be about 0.1 mm to about 4 mm, and preferably may be about 0.5 mm to about 1.5 mm. The perimeter of the central region may define a boundary between the central region and the annular region, and the annular region may therefore be adjacent to the central region.

The annular region may abut the central region. A blending region may be provided between the central region and the annular region. The blending region should not substantially affect the optics provided by the central region and the annular region, and the blending region may have a radial width of 0.05 mm or less, although it may also be as wide as 0.2 mm, or as wide as 0.5 mm in some embodiments.

The central region has a base power, which in the context of the present disclosure, is defined as the average absolute refractive power of the central region. Any base power meridians will also have the base power. The base power will correspond to the labelled refractive power of the contact lens as provided on the contact lens packaging (though in practice it may not have the same value). Thus, the lens powers given herein are nominal powers. These values may differ from the lens power values obtained by direct measurement of the lens, and are reflective of the lens powers that are used to provide a required prescription power when used in ophthalmic treatment.

For lenses used in the treatment of myopia, the base power will be negative or close to zero, and the central region will correct for distance vision. The base power may be between 0.5 diopters (D) and −15.0 diopters. The base power may be from −0.25 D to −15.0 D.

The maximum add power is non-zero; that is, each of the at least one maximum add power meridians will have a lens power that is greater (i.e., more positive than or less negative than) the base power of the central region. The power of the maximum add power meridian may be described as a maximum add power, which is the difference between the base power and the power of the maximum add power meridian. The maximum add power may be between about +0.5 and +20.0 D, preferably between about +0.5 and +10.0 D. For a lens having a positive base power, the power of each of the at least one maximum add power meridians will be more positive than the base power. For a lens having a lens having a negative base power, the power of each of the at least one maximum add power meridians may be less negative than the base power, or the power of each of the at least one maximum add power meridians may be a positive power. The net power of the annular region in the maximum add power meridian(s) will be the sum of the base power and the maximum add power.

Each of the at least one intermediate add power meridians may have a lens power that is greater (i.e. more positive than or less negative than) the base power of the central region. The power of the intermediate add power meridian may be described as an intermediate add power, which is the difference between the base power and the power of the intermediate add power meridian. The intermediate add power may be less than the maximum add power, and may be between about +0.1 and +10.0 D, preferably between about +0.1 and +3.0 D. For a lens having a positive base power, the power of each of the at least one intermediate add power meridians will be more positive than the base power. For a lens having a lens having a negative base power, the power of each of the at least one intermediate add power meridians may be less positive than the base power, or the power of each of the at least one intermediate add power meridians may be a positive power. The net power of the annular region in the intermediate add power meridian(s) will be the sum of the base power and the intermediate add power.

The lens may comprise at least two concentric annular regions, wherein each of the annular region comprises at least one maximum add power meridian having a curvature providing a maximum add power and centred on a centre of curvature that is a first distance from the optical axis, and at least one intermediate add power meridian having a curvature providing an intermediate add power of between zero dioptres of add power and the maximum add power and centred on a centre of curvature that is at a different distance from the optical axis than the first distance.

Each of the annular regions may be an annular region incorporating any of the features set out above. The maximum add power meridians of each annular region may be at the same θ values around the circumference of the annular region, and each of the intermediate add power meridians may be at the same θ values around the circumference of the annular region. Alternatively, the maximum add power meridians of each of the annular regions may be at different θ values around the circumference. The maximum add power meridians of each of the annular regions may have the same maximum add power. Each of the annular regions may have the same intermediate add power. Alternatively, the maximum add power meridians of each of the annular regions be different. Each annular region may have a plurality of maximum add power meridians, and each of the plurality of maximum add power meridians may have the same power or a different power. The intermediate add power of each annular region may be different.

Preferably, the annular region or annular regions do not include lenslets, or the annular region(s) are free of lenslets (that is, small lenses provided on a surface of the contact lens that have diameters that are smaller than the diameter of the optic zone of the contact lens). The add power of the annular region may be provided by a continuous lens surface. The lens surface may provide a smoothly varying add power.

The contact lens may be a toric contact lens. For example, the toric contact lens may include an optic zone shaped to correct for a person's astigmatism.

The contact lens may comprise an elastomer material, a silicone elastomer material, a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, and the like.

Alternatively, the lens may comprise, consist essentially of, or consist of a silicone elastomer material. For example, the lens may comprise, consist essentially of, or consist of a silicone elastomer material having a Shore A hardness from 3 to 50. The Shore A hardness can be determined using conventional methods, as understood by persons of ordinary skill in the art (for example, using a method DIN 53505). Other silicone elastomer materials can be obtained from NuSil Technology or Dow Chemical Company, for example.

By way of example, the lens may comprise a hydrogel or silicone hydrogel contact lens having a lens diameter of between 13 and 15 mm. The optic zone of the lens may have a diameter of between 7 and 9 mm. The annular region of the optic zone may have a maximum add power meridian having a maximum add power of between +2 and +20 D.

The annular region of the optic zone may have an intermediate add power meridian having an intermediate add power of between +1 and +10 D.

According to a second aspect, the present disclosure provides a method of manufacturing a lens. The method may comprise forming a contact lens, wherein the lens comprises a central region, the central region having a base power, and an annular region, wherein the annular region surrounds the central region. The annular region comprises at least one maximum add power meridian having a curvature providing a maximum add power and centred on a centre of curvature that is a first distance from the first optical axis. The annular regions also comprise at least one intermediate add power meridian having a curvature providing an intermediate add power of between zero dioptres of add power and the maximum add power and centred on a centre of curvature that is at a different distance from the optical axis than the first distance.

The lens may include any of the features set out above.

The method of manufacturing may comprise forming a female mold member with a concave lens forming surface and a male mold member with a convex lens forming surface. The method may comprise filling a gap between the female and male mold members with bulk lens material. The method may further comprise curing the bulk lens material to forms the lens.

The contact lens may be a molded contact lens. The lens can be formed by cast molding processes, spin cast molding processes, or lathing processes, or a combination thereof. As understood by persons skilled in the art, cast molding refers to the molding of a lens by placing a lens forming material between a female mold member having a concave lens member forming surface, and a male mold member having a convex lens member forming surface.

In a third aspect of the disclosure there is also provided a method of using the contact lens described herein. The methods may be effective in reducing progression of a refractive error, such as reducing the progression of myopia. When the present lenses are used to reduce the progression of myopia, the methods include a step of providing the contact lenses to a person whose eyes are able to accommodate for varying near distances (e.g., in a range of from about 15 cm to about 40 cm). Some embodiments of the methods include a step of providing the ophthalmic lenses to a person that is from about 5 years old to about 25 years old. The providing can be performed by an eye care practitioner, such as an optician or optometrist. Alternatively, the providing can be performed by a lens distributor that arranges for the delivery of the ophthalmic lenses to the lens wearer.

Figure 1B:
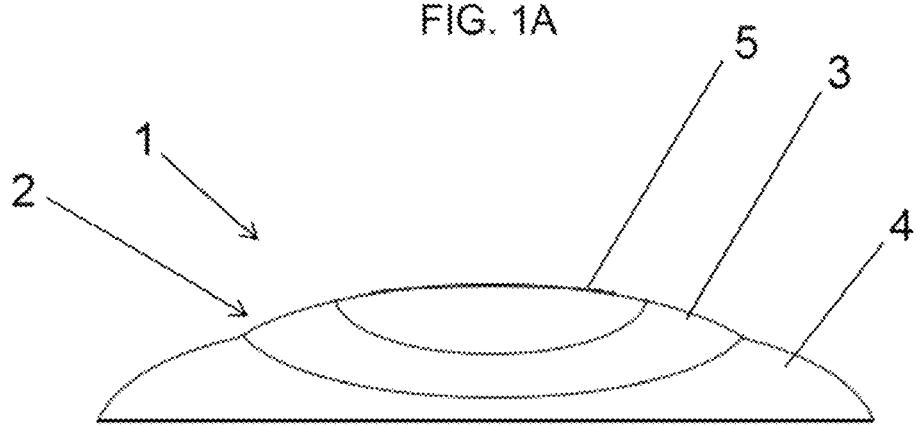
FIG. 1B is a side view of the contact lens of FIG. 1A.

FIG. 1A shows a schematic top view of a lens for use in the slowing progression of myopia (e.g., myopia control). The lens 1 comprises an optic zone 2, which approximately covers the pupil, and a peripheral zone 4 that sits over the iris. The peripheral zone 4 provides mechanical functions, including increasing the size of the lens thereby making the lens 1 easier to handle, providing ballasting to prevent rotation of the lens 1, and providing a shaped region that improves comfort for the lens 1 wearer. The optic zone 2 provides the optical functionality of the lens 1, and the optic zone comprises an annular region 3 and a central region 5. This lens 1 has a positive base power, and the radius of curvature of the anterior surface of the annular region 3 is smaller than the radius of curvature of the anterior surface of the central region 5. (This is shown in an exaggerated schematic form in FIG. 1B and in the corresponding ray diagram of FIG. 2A). The annular region 3 therefore has a greater power than the base power of the central region 5.

The focus 11 of the annular region 3 lies on a proximal focal surface 13, and the focus 15 for the central region 5 lies on a distal focal surface 17, which is further away from the posterior surface of the lens 1. The focus 11 of the annular region 3 and the focus 15 of the central region 5 share a common optical axis 19. As shown in FIG. 2C, for a point source at infinity, light rays focused by the central region 5 form a focused image 23 at the distal focal surface 17. Light rays focused by the central region 5 also produce an unfocused blur spot 27 at the proximal focal surface 13.

As shown in FIG. 2B, light rays focused by the annular region 3 form a focused image 21 at the proximal focal surface 13. Light rays focused by the annular region 3 diverge after the proximal focal surface 13, and the diverging light rays produce an unfocused annulus 25 at the distal focal surface 17. As discussed above, the unfocused annulus image 25 may result in wearers of the lens 1 seeing a 'halo' around focused distance images.

Figure 3A:
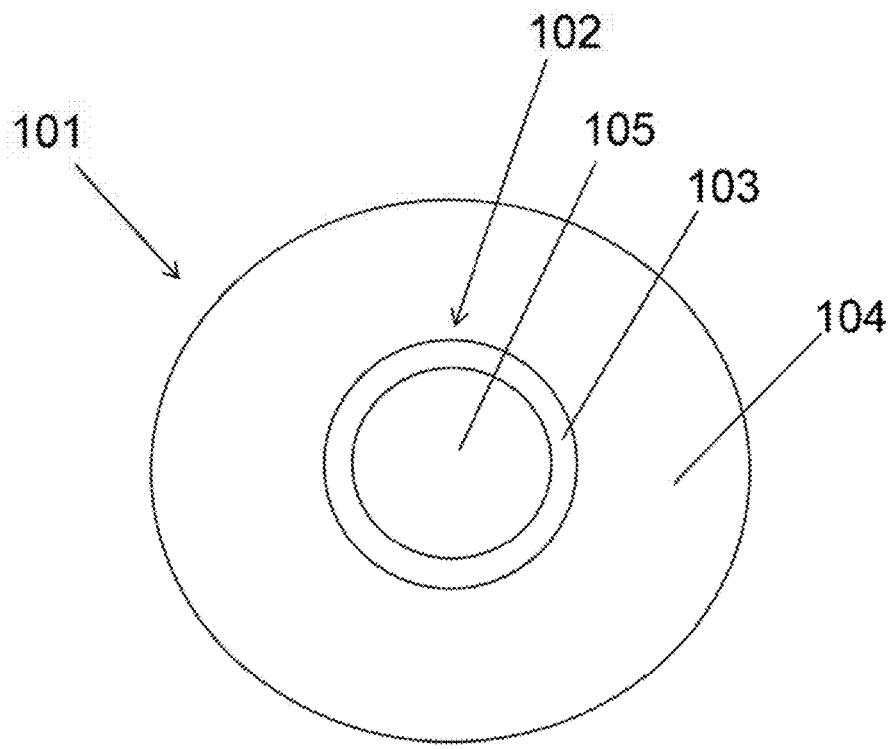
FIG. 3A is a top view of a different contact lens having non-coaxial optics for use in the prevention of myopia.
Figure 3B:
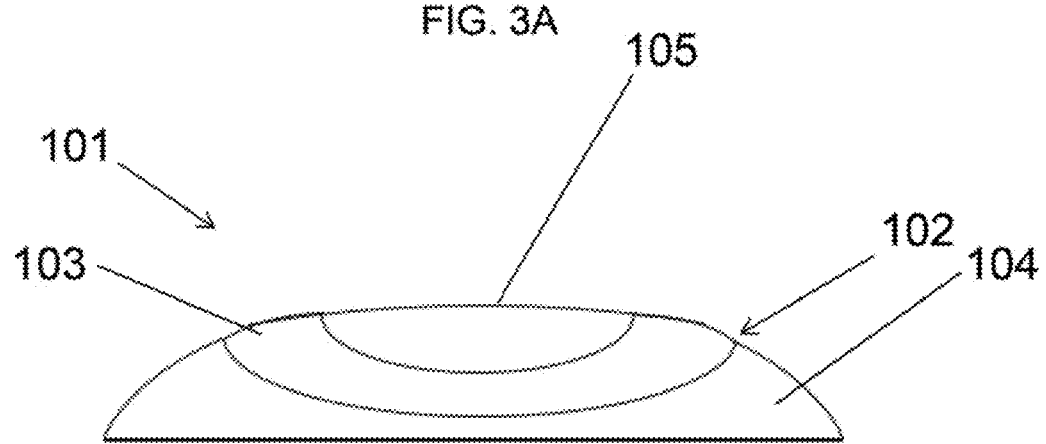
FIG. 3B is a side view of the contact lens of FIG. 3A.
Figures 4A, 4B, 4C:
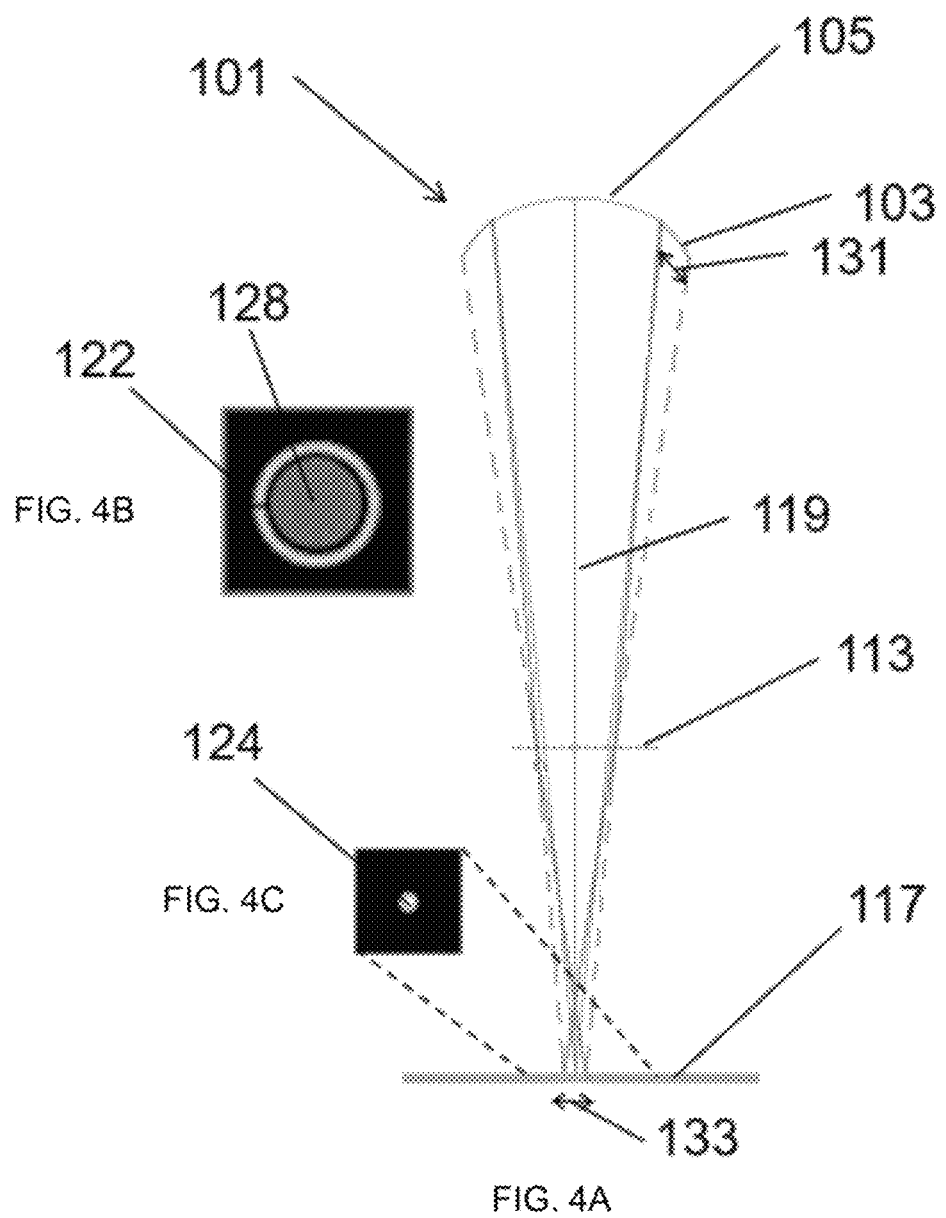
FIG. 4A is a ray diagram for the lens of FIGS. 3A-B.
FIG. 4B shows a light pattern at a proximal focal surface of the lens of FIGS. 3A-B formed from a distant point source.
FIG. 4C shows a light pattern at a distal focal surface of the lens of FIGS. 3A-B formed from a distant point source.
Figure 4D:
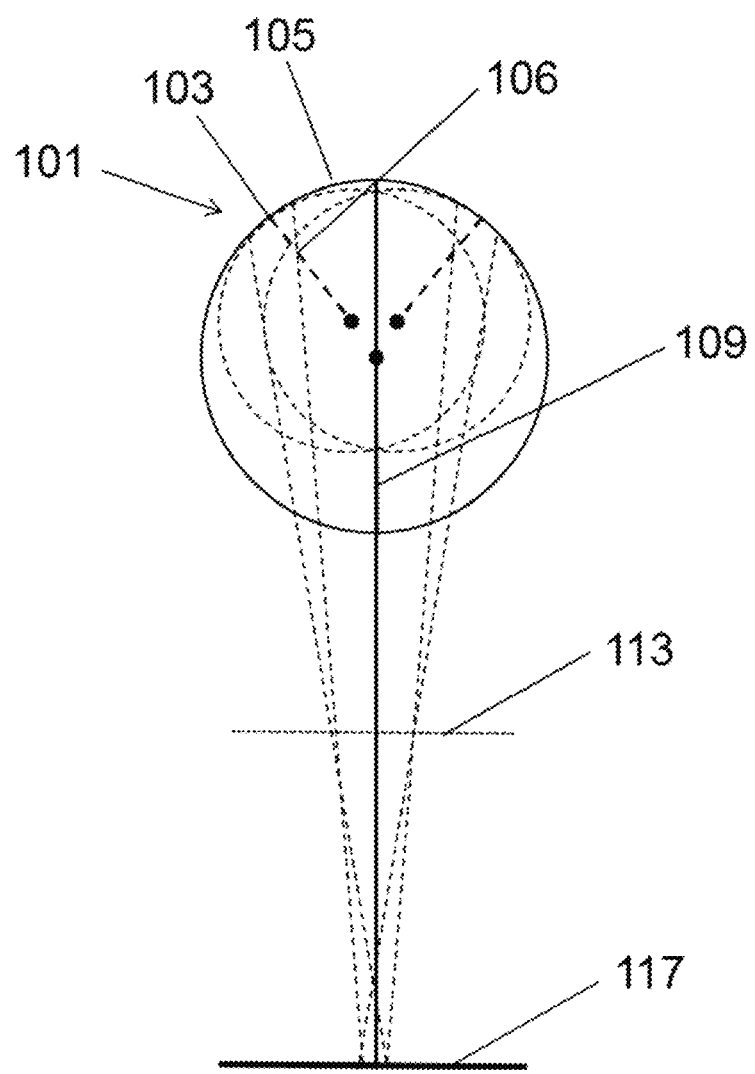
FIG. 4D is a partial ray diagram for the lens of FIGS. 3A-B together with circles indicating the radii of curvature of the central distance region (solid line) and the annular add region (dashed line) of the contact lens.

FIG. 3A shows a schematic of another known lens 101 that is used in the treatment of myopia, which is designed to eliminate the halo that is observed around focused distance images. Similar to the lens 1 shown in FIGS. 1A and 1B the lens 101 comprises an optic zone 102 and a peripheral zone 104 surrounding the optic zone 102. The optic zone 102 comprises a central region 105 and an annular region 103 that surrounds the central region 105. As shown in FIG. 3B and the corresponding ray diagram of FIGS. 4A and 4D, this lens 101 is a positive base power lens and the anterior surface of the annular region 103 has a greater curvature than the anterior surface of the central region 105, and therefore provides a greater power than the base power of the central region 105. As shown in FIG. 4D, the anterior surface of the central region 105 defines a portion of a surface of a sphere of larger radius 109. The anterior surface of the annular region 103 defines a curved annular surface with smaller radius 106.

At the distal focal surface 117, light rays passing through the central region 105 are focused. The annular region 103 acts as an optical beam stop, which leads to a small spot size 133 of light at the distal focal surface 117, as shown in FIG. 4C.

A single image is not formed at the proximal focal surface 113. As shown in FIG. 4B, at the proximal focal surface 113, for a point source at infinity, light rays passing through the central region 105 generate a blur circle 128, as does the lens of FIGS. 1A-B and 2A-B. However, light rays from a distant point source passing through the annular region 103 generate a focused annulus 122, as shown in FIG. 4B, which surrounds the blur circle 128. FIG. 4B shows the light pattern generated for a distant point source. In contrast to the lens 1 of FIG. 1, the lens 101 of FIGS. 3 and 4 does not generate a single image or an on-axis image at the proximal focal surface 113 that could be used to avoid the need for the eye to accommodate for near objects. For an extended object at distance, the focused image formed at the proximal focal surface 113 is a convolution of (i) the focused image of the extended object that would be obtained with a conventional lens having the optical power of the annular region 103 and (ii) an optical transfer function representing the optical effect of the annular region 103.

In contrast to the lens of FIGS. 1 and 2, an annulus or 'halo' effect does not occur at the distal focal surface 117.

Figure 5A:
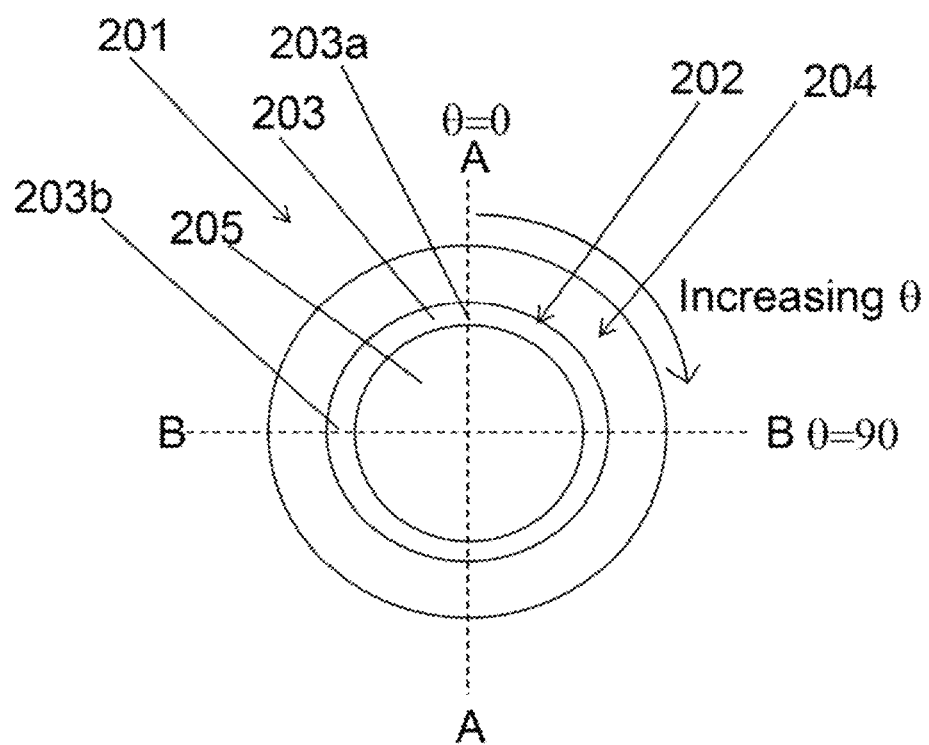
FIG. 5A is a top view of a lens according to an embodiment of the present disclosure, showing a convention for the variation of θ around the lens, and showing the position of a line A-A along a maximum add power meridian and a line B-B along a base power meridian.
Figure 5B:
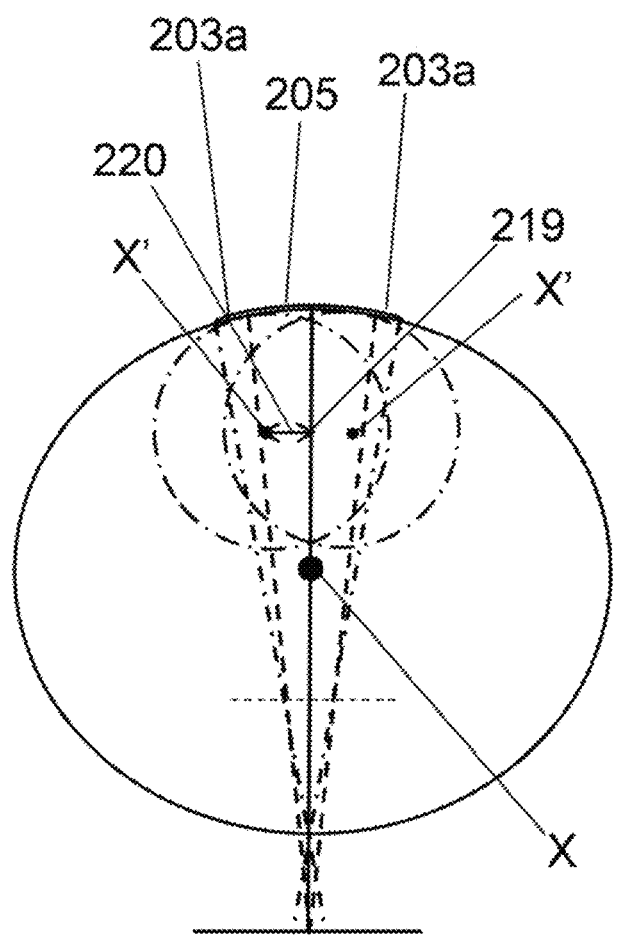
FIG. 5B is a ray diagram for light rays intersecting the lens of FIG. 5A along the line A-A showing the optical axis of the central region and centre of curvature of the anterior surface along the maximum add power meridian.
Figure 5C:
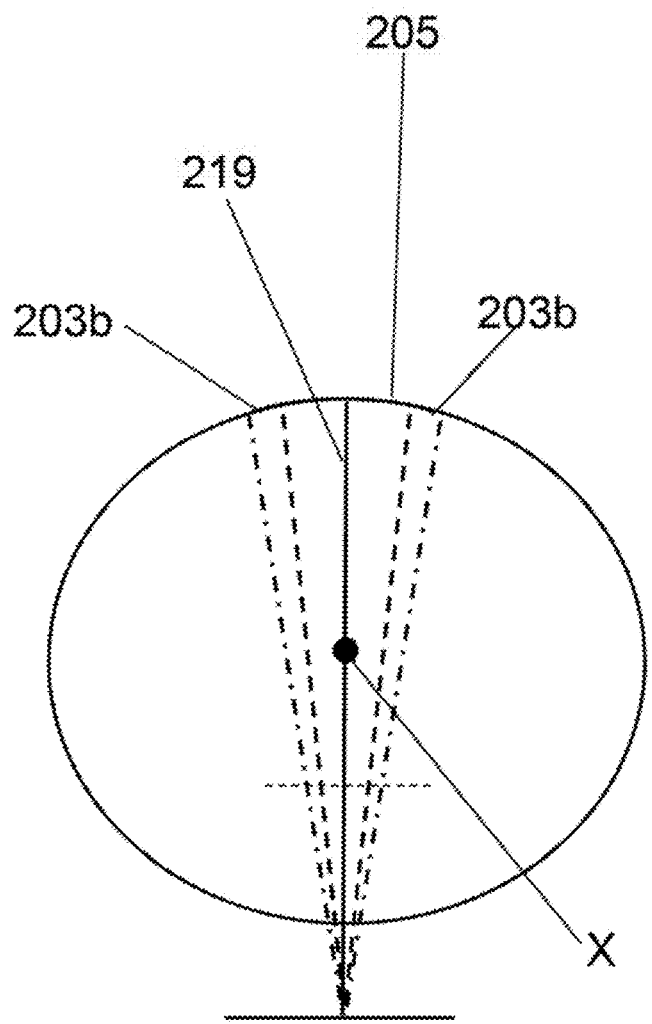
FIG. 5C is a ray diagram for light rays intersecting the lens of FIG. 5A along the line B-B showing the optical axis of the central region and centre of curvature of the anterior surface along the base power meridian.

FIG. 5A shows a top view of a schematic lens according to an embodiment of the present disclosure. The position around the circumference of the lens can be indicated by an angle $\theta$, where theta varies between 0° and 360°. In this example, the line A-A lies along $\theta=0°$ and the line B-B lies along $\theta=90°$. FIG. 5B shows a schematic partial ray diagram, for light rays intersecting the lens along a line A-A, and FIG. 5C shows a partial ray diagram for light rays intersecting the lens along a line B-B. Similar to the lenses 1 and 101 shown in FIGS. 1A, 1B, 3A, and 3B, the lens 201 comprises an optic zone 202 and a peripheral zone 204 surrounding the optic zone 202. The optic zone 202 comprises a central region 205 and an annular region 203 that surrounds the central region 205. The central region 205 has a base power which is determined at least in part by the curvature of the anterior surface. The lens 205 has a positive base power.

The curvature of the anterior surface of the annular region 203 differs at different points around the circumference, and this leads to a circumferentially varying add power of the annular region 203. The add power of the annular region 203 varies in an oscillatory manner around the circumference, between a maximum value (as shown in FIG. 5B), where the add power of the annular region 203a is comparable to that of the annular region shown for the lens of FIG. 3A, and a zero add power (as shown in FIG. 5C), where the power of the annular region 203b is the same as the base power of the central region 205. For the lens 201 shown in FIG. 5A, the add power of the annular region 203 is a maximum along the line A-A ($\theta=0$) and the add power is 0 D along the line B-B ($\theta=90/270°$, i.e., the add power varies with a period of 180°. Between the lines A-A and B-B the add power has intermediate values.

The optical axis of the central region 205 is shown by the line 219 in FIGS. 5B and 5C, and the centre of curvature, indicated by X of the anterior surface of the central region 205 lies on the optical axis 219. The annular region 203 has a maximum add power meridian 203a along the line A-A, and a base power meridian 203b along the line B-B. The anterior surface of the maximum add power meridian 203a has a curvature providing a maximum add power and centred on a centre of curvature, indicated by X', that is a first distance, indicated by the line 220, from the first optical axis. The anterior surface of the base power meridian 203b along the line B-B has a curvature providing the base power and centred on the same centre of curvature A as the central region 205.

Figure 6A:
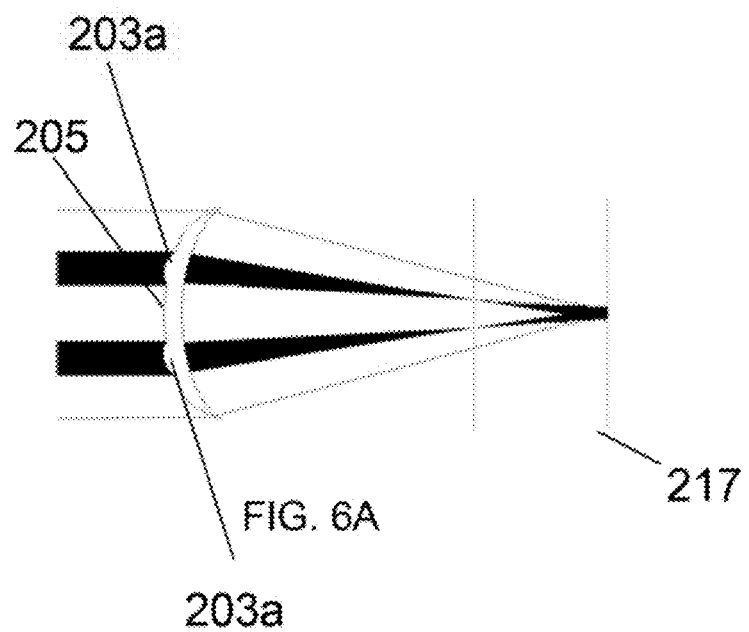
FIG. 6A is a vertical cross section taken through the lens of FIG. 5A, showing light rays focused at a maximum add power focal surface and at a distal optic focal surface.
Figure 6B:
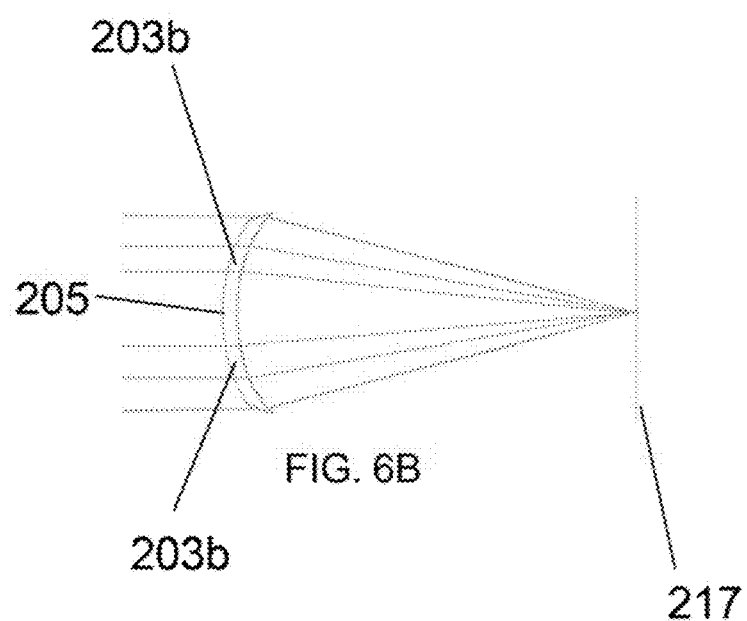
FIG. 6B shows the lens of FIG. 6A rotated circumferentially by 90 degrees, and shows light rays focused at the distal optical focal surface.

FIG. 6A shows a vertical cross section taken through a lens 201 along the line A-A (i.e., along the maximum add power meridian 203a), according to an example embodiment of the present disclosure. FIG. 6B shows the same lens, rotated circumferentially through 90°, such that that the cross section is along the line B-B (i.e., along the base power meridian 203b).

FIG. 7A shows a ray diagram of light rays that intersect the lens 201 of FIG. 5A along the line A-A. Along this line, the add power of the annular region 203a is at a maximum, the anterior surface of the annular region 203a has a greater curvature than the anterior surface of the central region 205, and therefore provides a greater power than the base power of the central region 205. The anterior surface of the central region 205 defines a portion of a surface of a sphere of a first radius and the anterior surface of the annular region 203a defines a curved annular surface with a smaller radius of curvature, in a similar manner to the lens shown in FIG. 4D.

Light rays intersecting the lens 201 along the line A-A and passing through the central region 205 are focused at a distal focal surface 217, as shown in FIGS. 6A, 6B, and 7A-7C. At a max add power focal surface 230a, light rays from a point source at infinity that intersect the lens 201 along a line A-A and that pass through the central region 205 will not form a focus, whereas light rays from a distant point source intersecting the lens 201 along a line A-A and passing through the maximum add power annular region 203a will be focused away from the optic axis of the central region 219.

FIG. 7C shows a ray diagram of light rays intersecting the lens 201 along the line B-B. Along this line, the add power of the annular region 203b is zero. The anterior surface of the annular region 203b has the same curvature in a radial direction as the anterior surface of the central region 205. Light rays intersecting the lens 201 along the line B-B and passing through the central region 205 are focused at a distal focal surface 217, as shown in FIGS. 6A, 6B, and 7A-7C. Light rays from a distant point source intersecting the lens along a line B-B and passing through the zero add power annular region 203b are also focused at the distal focal surface 217.

Figure 8:
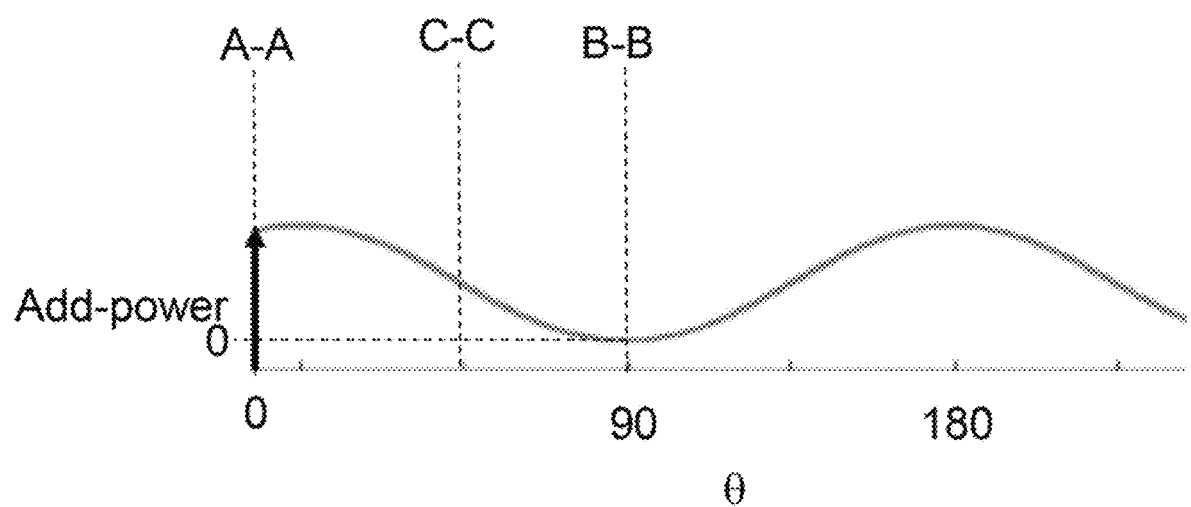
FIG. 8 is a plot showing the variation in add power of the annular region of the lens of FIG. 5A with the angle θ.

FIG. 7B shows a ray diagram of light rays intersecting the lens along a line C-C, which is a line along θ=45°. Along this line the add power of the annular region 203c is an intermediate value between that of the annular zone 203a along the line A-A and the annular zone 203b along the line B-B. The anterior surface of the annular region 203c defines a curved annular surface with a smaller radius of curvature than the annular region 203b but a larger radius of curvature than the annular region 203a. Light rays intersecting the lens 201 along the line C-C and passing through the central region 205 are focused at a distal focal surface 217. At an intermediate add power focal surface 230a, light rays from a point source at infinity that intersect the lens 201 along a line C-C, and pass through the central region 205 will not form a focus, whereas light rays from a distant point source intersecting the lens 201 along a line C-C and passing through the annular region 203c are focused. The intermediate focal surface 230c is closer to the lens 201 than the maximum add power focal surface 230a. FIG. 8 shows variation in add power with θ for the annular region 203 of lens 201 shown in FIGS. 5A-C, 6A-B and 7A-C. For the lens 201 shown in FIGS. 5A-7C, the add power is determined, at least in part, by the curvature of the anterior surface of the annular region 203. The add power is defined relative to the base power of the central region 205, and so an add power of zero means that the curvature in a radial direction, of the anterior surface of the annular region 203 matches the curvature of the central region 205. For the lens 201 shown in FIGS. 5A-7C, the radial curvature of the anterior surface of the annular region 203 and hence the add power of the annular region 203 varies continuously, in an oscillatory manner with meridian angle theta (θ).

Figure 9:
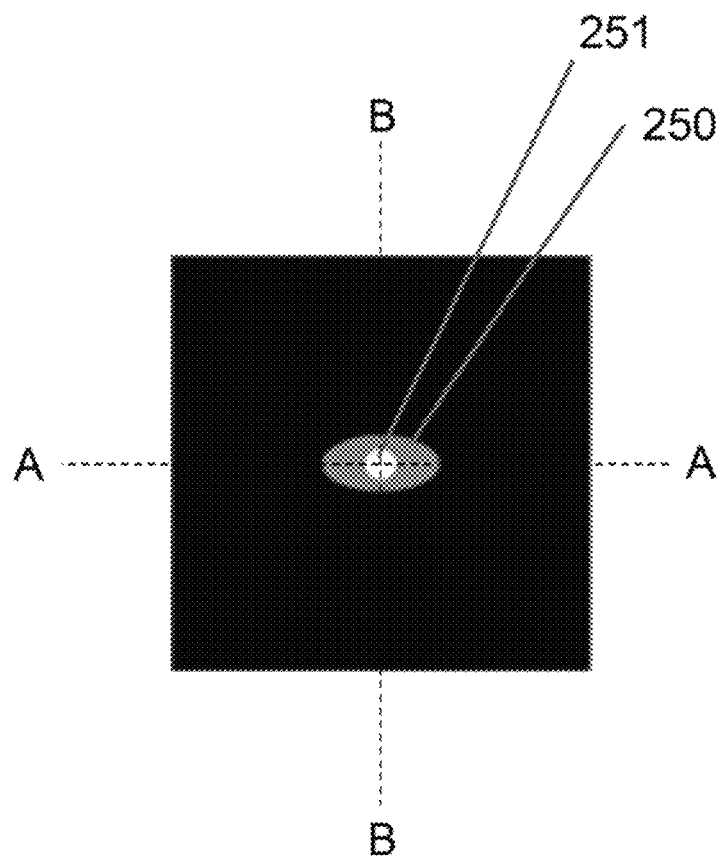
FIG. 9 shows a light pattern at a distal focal surface of the lens of FIG. 5A formed from a distant point source.

Light rays from a distant point source intersecting the lens 201 passing through the annular region 203 will not form a single image in in front of the distal focal surface 217, but will create a focused annular waveform away from the optic axis of the central region 219, with a defocus that varies about the central optic axis 219 with angle θ. At the distal focal surface 217, a meridionally varying blur pattern 250 is produced by light rays from a distant point source intersecting the lens 201 passing through the annular region 203, as shown in FIG. 9. The blur pattern 250 surrounds a focused spot 251 produced by light rays passing through the central region 205. Blurring is greatest along a line A-A that coincides with the maximum add power meridian 203a.

Thus, considering the annulus as a whole and moving round the meridians, light rays from a distant point source intersecting the lens 201 and passing through the annular region form a focal line that loops towards the retina from the maximum add power focal surface (where the line is closest to the front of the eye) at 0 degrees (12 o'clock), to the intermediate add power focal surface at 45 degrees, to the minimum add power focal surface at 90 degrees (3 o'clock, where the line is closest to the retina) then back again towards the front of the eye, through the intermediate add power focal surface at 135 degrees to the maximum add power focal surface at 180 degrees (6 o'clock). The cycle repeats between 180 degrees and 360 degrees; the loop is symmetric about the lines A-A and B-B. Light rays from a point source at infinity that intersect the lens and pass through the central region are focused at the distal focal surface.

Figure 10:
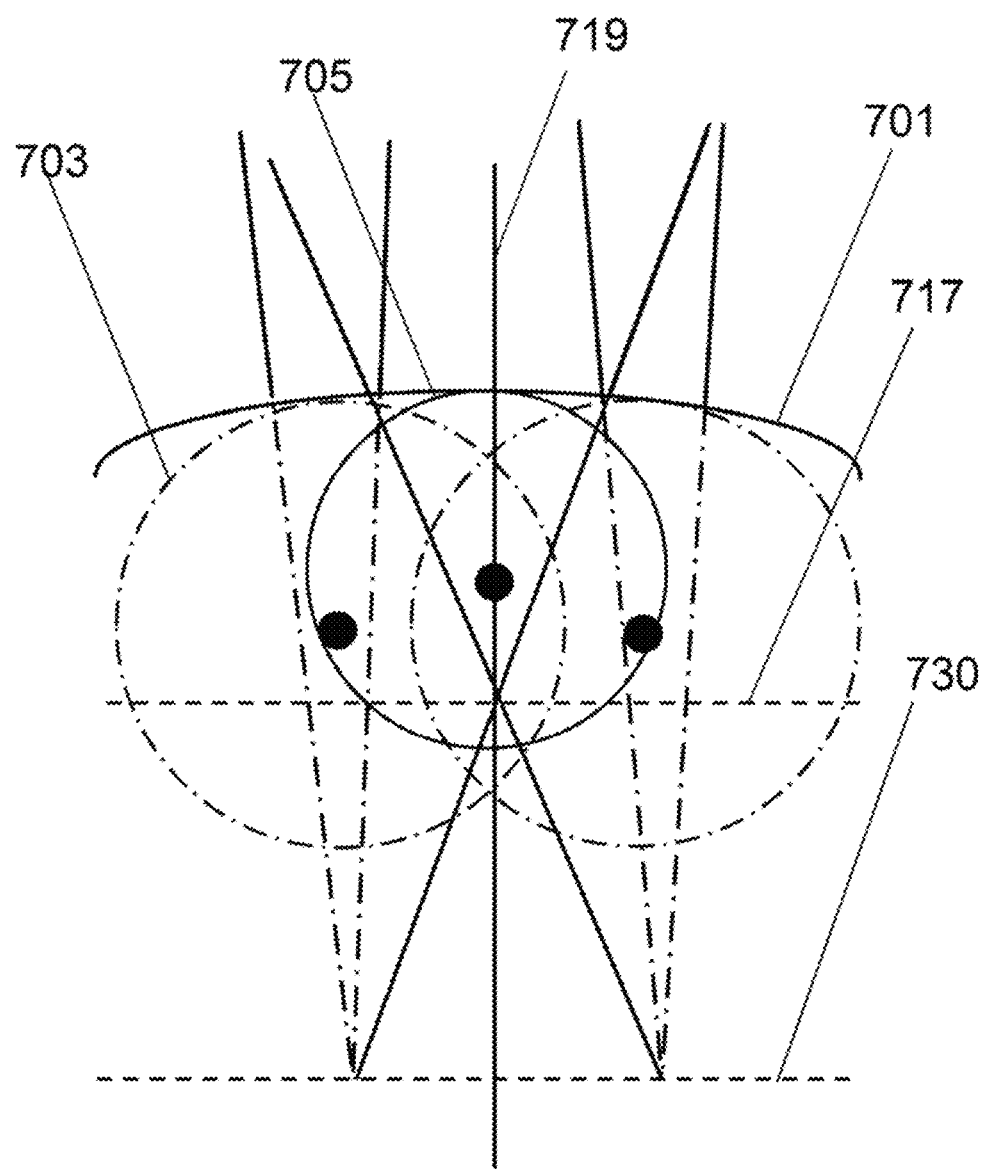
FIG. 10 is a partial ray diagram for a negative base power lens, together with circles indicating the radius of curvature of the central distance region (solid line) and the annular add region (dashed-dotted line) of the contact lens.

The lenses described above have a positive base power. In other embodiments of the present disclosure, the base power of the lens 701 is negative. FIG. 10 shows a partial ray diagram for a negative base power lens 701, for a cross section cutting through a maximum add power meridian. The central region 705 of the lens 701, indicated by the solid circle in FIG. 10 has a negative base power, and the annular region 703, indicated by the dot-dashed circle, has a less negative power. The central region 705 of the lens has a greater curvature, and a smaller radius of curvature than the annular region 703. The centre of curvature of the central region 705 is focused on the optic axis 719. The centre of curvature of the annular region 703 is offset from the optic axis of the central region 719. A virtual focal point for light rays passing through the central region is on the virtual distal focal surface 717. At a virtual maximum add power focal surface, light rays 730 from a distant point source passing through the annular region 703 form a virtual focused annulus.

The power of lenses according to embodiments of the present disclosure can be defined either as (i) a curvature-based power, Pc, or (ii) a sagittal-(or slope-)based power $P_S$.

For a wavefront W, at a point a radial distance r (pupil radius) from a line normal to the centre of the wavefront, $W(r)=A*r^2$, where A is a function.

The wavefront curvature or curvature based power, $P_c$, is a function of the second derivative of the wavefront. The wavefront slope, or slope based power $P_S$, a function of the first derivative of the wavefront and varies with the slope of the wavefront.

For a simple spherical lens, the curvature based power, $P_c$, is defined as:

$$P_C = \frac{\partial^2 W}{\partial r^2} = \frac{\partial (2Ar)}{\partial r} = 2A$$

The slope based power $P_S$ is defined as $$P_S = \frac{1}{r}\frac{\partial W}{\partial r} = \frac{2Ar}{r} = 2A$$

i.e. $P_C=P_S$ for a simple lens with paraxial assumptions.

For lenses according to embodiments of the present disclosure, as $P_c$ is a function of the second derivative of the wavefront, the curvature based power profile gives the power of the annular and central regions of the present lenses, irrespective of the relative orientations of the regions. However, because in the present lenses the annular region(s) are "tilted" radially outwards or inwards relative to the central region, their slope S is changed from its "un-tilted" value, whereas their curvature is unchanged, and so the slope-based lens power $P_s$ does not give the same value as the power $P_c$.

Figure 11A:
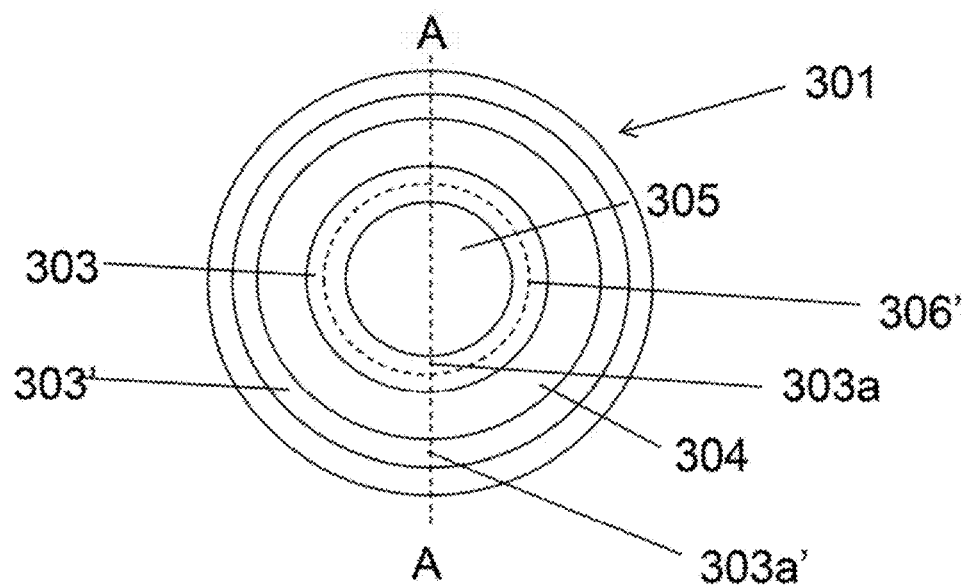
FIG. 11A is a top view a lens according to an embodiment of the disclosure comprising two concentric annular regions.
Figure 11B:
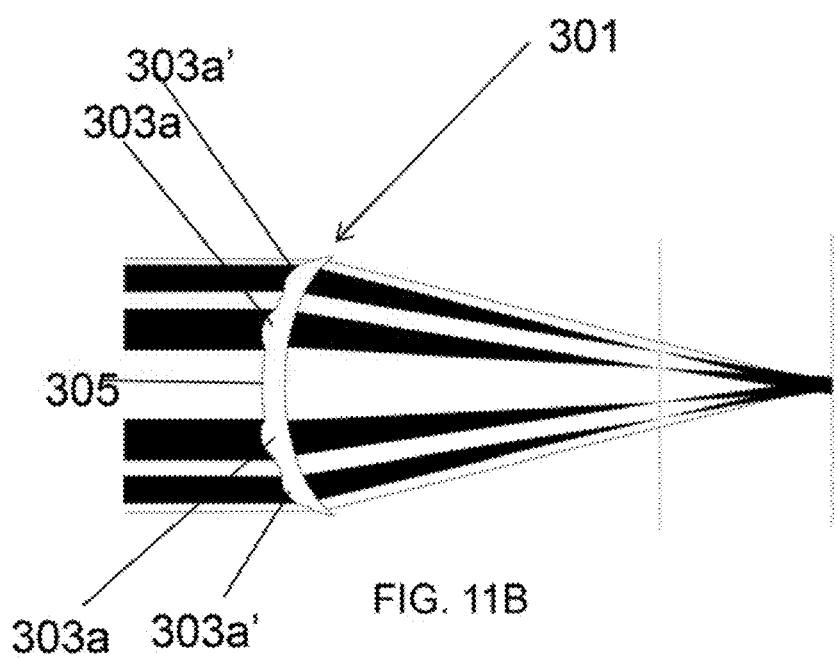
FIG. 11B is a vertical cross section taken through the lens of FIG. 11A taken along the line A-A.
Figure 12:
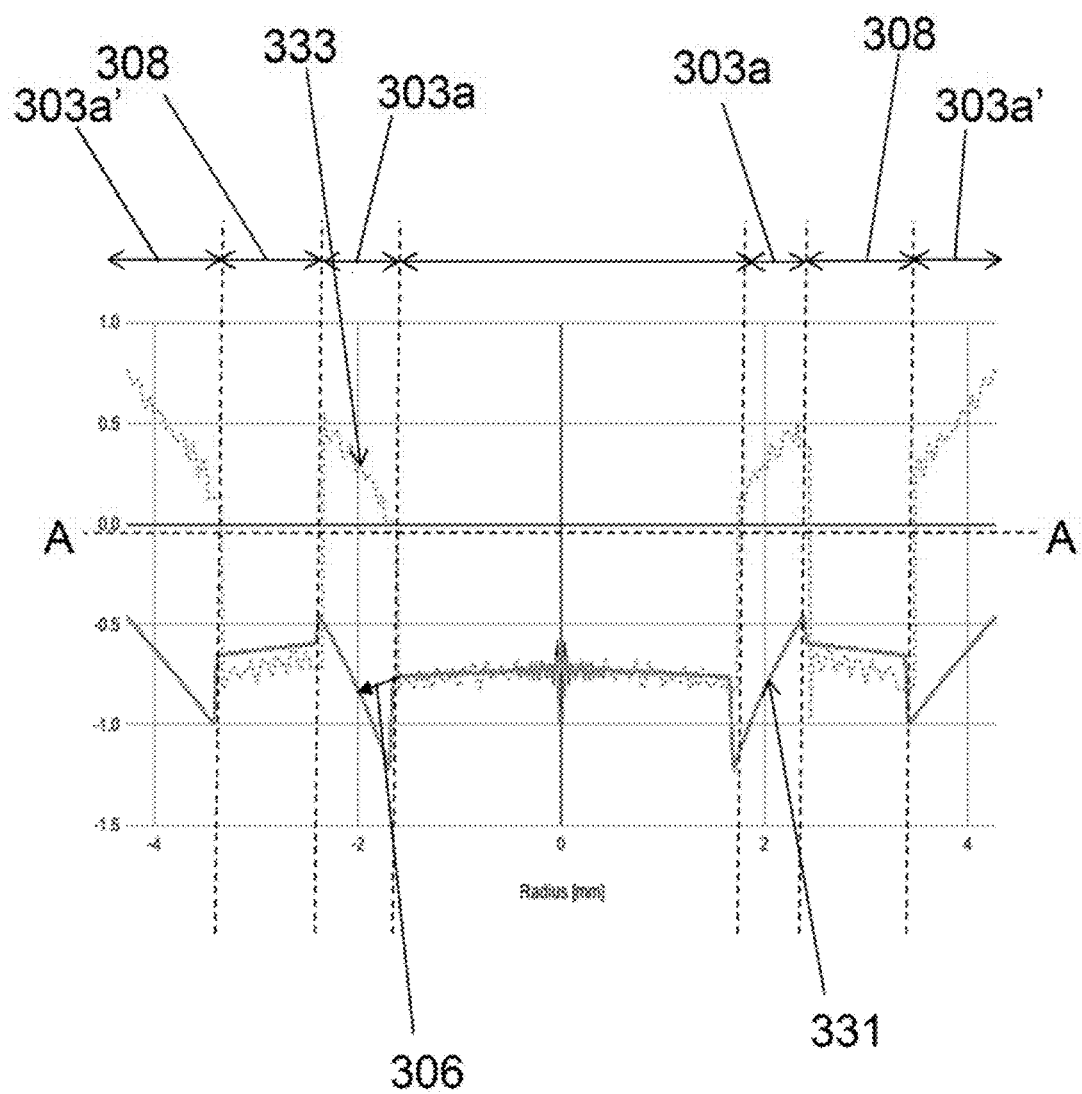
FIG. 12 is a plot showing the variation in sagittal- and curvature-based power for the lens shown in FIGS. 11A and 11B.

FIGS. 11A and 11B show a lens 301 according to an embodiment of the disclosure. The lens 301 is similar to the lens shown in FIGS. 5A-7C, but with a further concentric annular region 303' that acts as a second add power zone. The power profile of the lens 301 varies in an oscillatory manner as a function of radial distance for different θ values. The add power of the second annular region 303' varies in the same way (including with maxima and minima at the same theta values, i.e., meridians) as the first annular region 303. FIG. 12 shows the power as a function of radius for a line A-A, with θ=0°, which is a maximum add power line, with 0 on the x-axis corresponding to the centre of central region 305.

In FIG. 12, the continuous curve 331 shows the slope-based power $P_s$, and the dotted curve 333 shows the curvature-based power $P_c$.

The lens of FIGS. 11A and 11B has a nominal base power of −0.75 Diopter (D). As shown in FIG. 12, the slope-based and curvature based powers, $P_s$ and $P_c$ are approximately constant (and equal) across the central region of the lens 305. For the lens of FIGS. 11A and 11B, the centre of a circle that defines the radius of curvature of the anterior surface of the annular region 303a is shifted relative to the centre of a circle that defines the radius of curvature of the anterior surface of the central region 305, similarly to the lens shown in FIG. 4D. Because $P_s$ is a function of the slope of the lens surface, the combined tilt and curvature of the annular region 303a relative to the central region 305 gives rise to a sagittal power $P_s$ that is a ramp starting more negative than the distance power (a "negative add" power) at the inner edge of the annular region 303a and increasing with increasing radius to a power less negative than the distance power (an add power) at the outer edge of the annular region 303a. The tilt of the annular region 303a has been chosen to ensure that the sagittal power $P_s$ of the lens 301 at the radial midpoint of the annular region 303a matches the power of the central region 305 (in particular, the power the central region would have if it were extended out to that midpoint, as indicated by the arrow 306 in FIG. 12 and dashed line 306' in FIG. 11A). Thus, the tilt of the annular region 303a is chosen so that the average add power is (at least approximately) 0 D, according to the sagittal method of calculating optical power.

The distance region 308 in between the first annular region 303a and the second annular region 303a' nominally has the same power as the central region 305, but depending on choice of asphericity and common lens design practices, can have the same or somewhat more or less negative power than the center zone.

As discussed above, the true power $P_c$ is a function of the curvature of the lens, i.e., the second derivative of the wavefront, and is not affected by the tilt of the annular regions 303a/303a'. As can be seen in FIG. 12, the curvature-based power of the annular regions 303a/303a' is positive, i.e., the regions provide an add power across their width, which in this example increases with increasing radial distance from the lens center.

Figure 13:
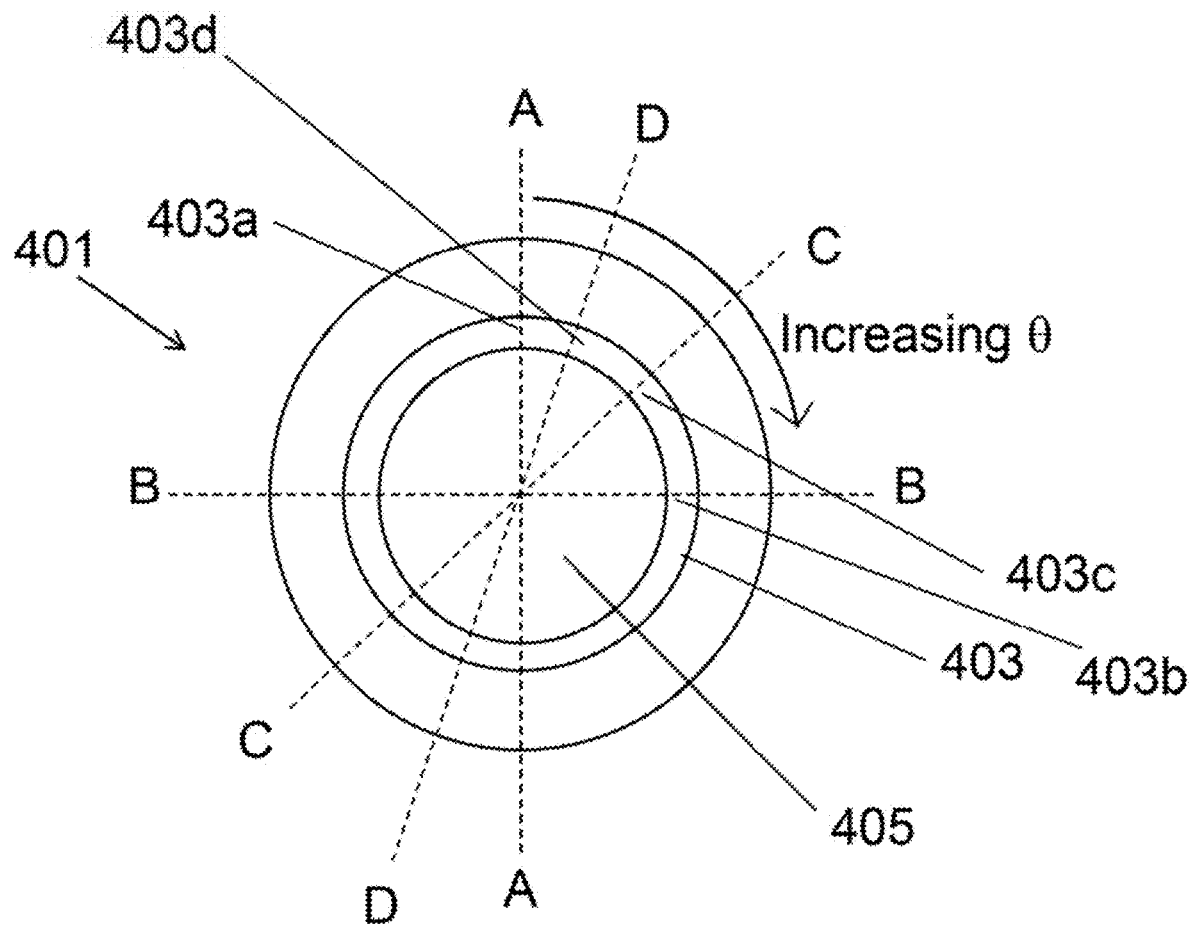
FIG. 13 is a top view of a lens according to an embodiment of the present disclosure showing lines A-A, B-B, C-C and D-D at different θ values.
Figure 14:
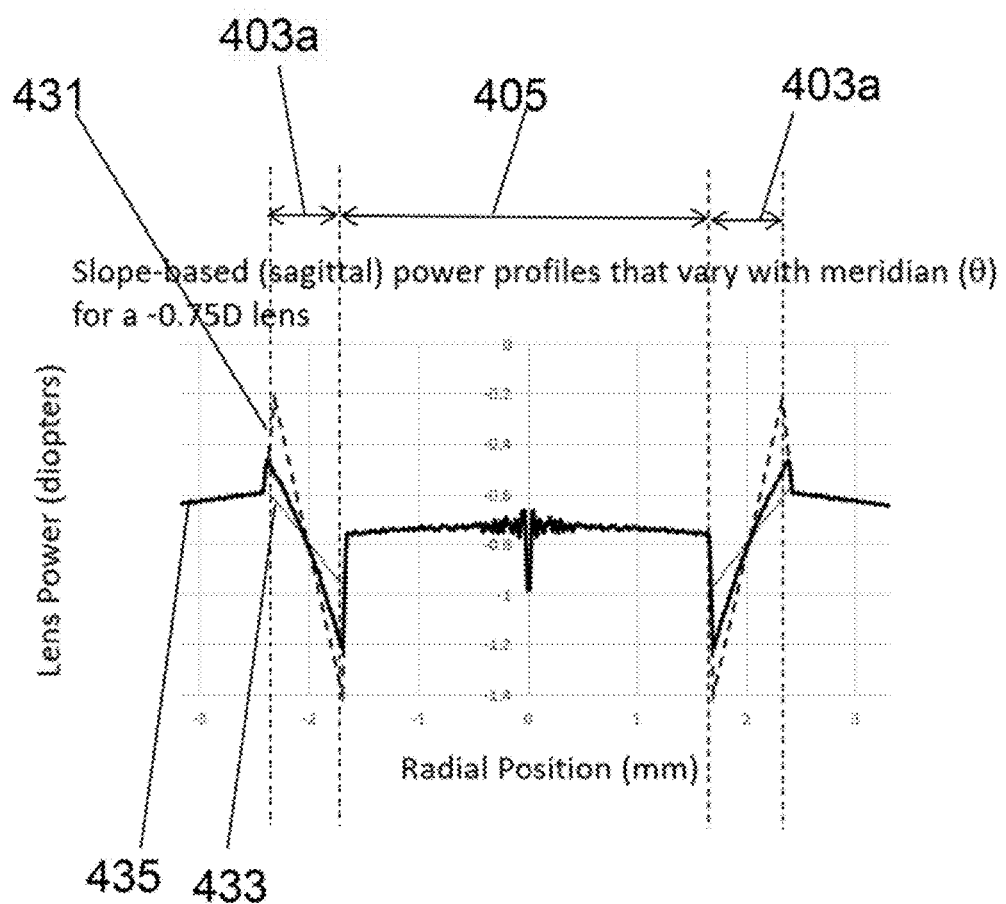
FIG. 14 is a plot showing variation in sagittal power with radial position for the lens shown in FIG. 13.

FIG. 13 shows a further lens 401 according to an embodiment of the present disclosure with a nominal −0.75 D power and single annular region 403. FIG. 14 shows the variation in sagittal power for this lens 401 taken along different θ values. The variation in sagittal power has a similar shape to that shown in FIG. 12. The sagittal power becomes less negative with increasing radius, and the slope of that ramp across the annular region 403 is different at the different θ values. The dashed curve 431 shows sagittal power along a line A-A (θ=0°), which intersects a maximum add power annular region 403a. The sagittal power increase with radius has a relatively steep slope. The dotted curve 433 and solid curve 435 show sagittal power along the lines C-C and D-D respectively. The line C-C intersects an intermediate add power region 403c, and hence the sagittal power has a shallower slope between the central region 405 and the annular region 403c. The line D-D intersects a low add power region 403d, and hence the sagittal power has a still shallower slope between the central region 405 and the annular region 403d. Along the line B-B (θ=90°), the add power of the annular zone 403b is zero, and the power profile would be a smooth extension of the power of the central distance region 405. The average value of the sagittal powers, at the midpoint of the annulus 403, is the same at all θ values. It is equal to the power the distance region would have if it were extended out to that point; i.e., the average sagittal add power is 0 D. However, it will be understood from the above discussion that the actual power, the curvature-based power, of the distance region does provide an add power, which is a maximum along the line A-A, less along the line C-C, still less along the line D-D, and 0 D along the line B-B.

Figure 15:
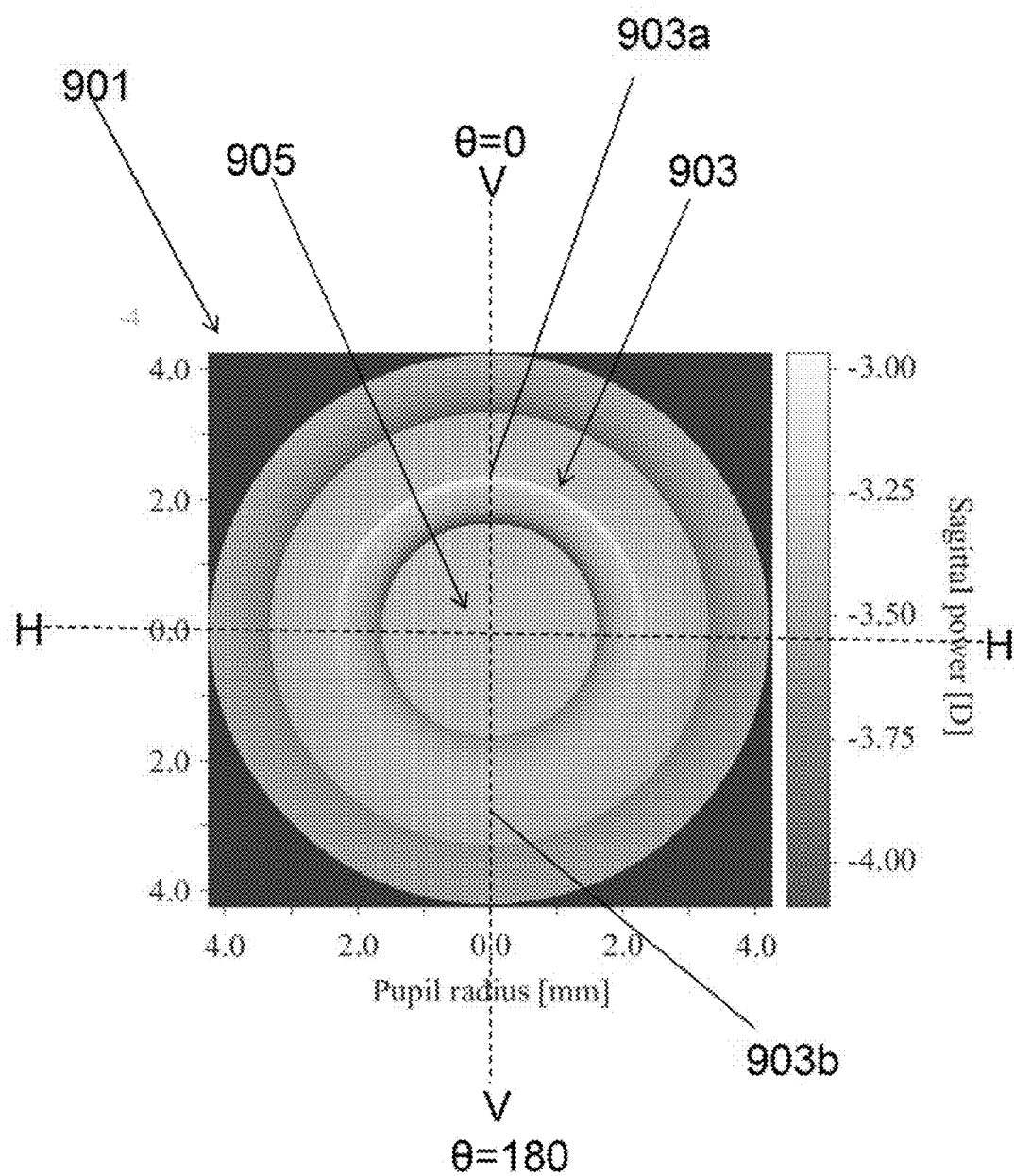
FIG. 15 is a 2-dimensional plot showing modelling of the sagittal power of a lens according to an embodiment of the present disclosure.

FIG. 15 is a 2-dimensional plot showing the variation in $P_S$ for a lens 901 according to an embodiment of the present disclosure. The annular region 903 comprises a maximum add power meridian 903a at the top of the lens (θ=0°). The intermediate add power meridian with the minimum add power is at the bottom of the lens (θ=180°) 903b.

Figure 16:
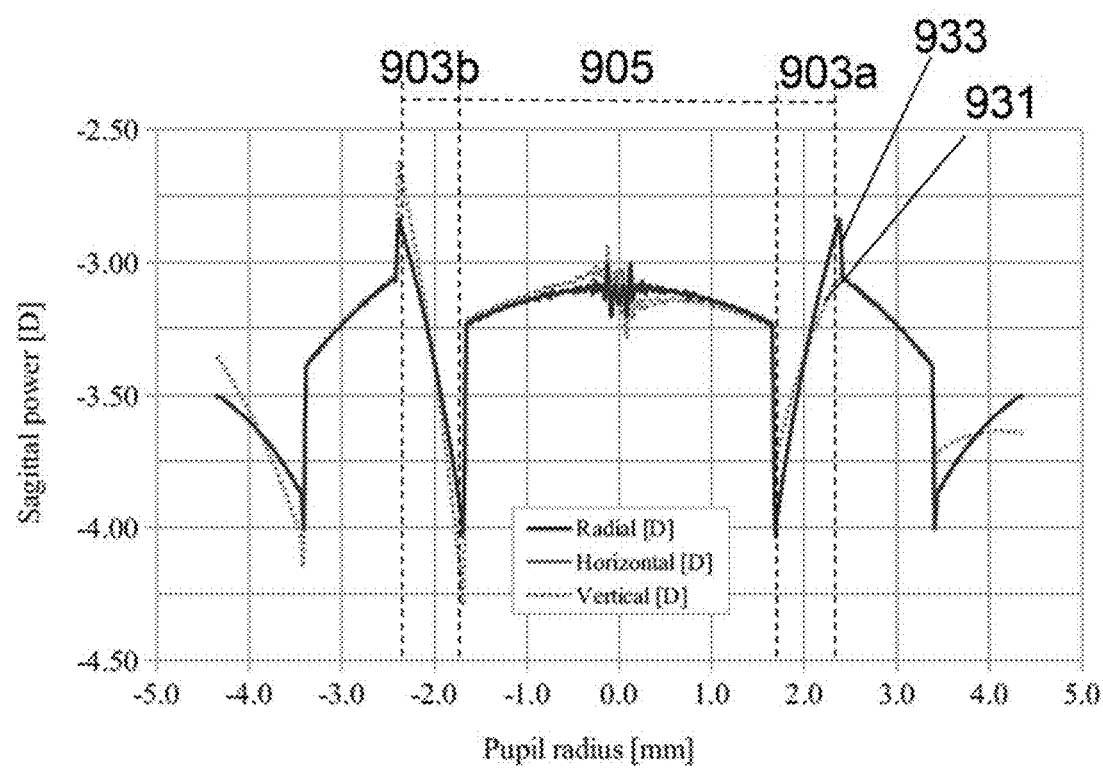
FIG. 16 is a plot showing $P_S$ as a function of radial distance from the centre of the lens for the lens modelled in FIG. 15.

FIG. 16 shows $P_S$ as a function of radial distance from the centre of the lens, for the lens 901 of FIG. 15 (with a radius of 0 corresponding to the centre of the lens 901). The dotted curve 931 shows $P_S$ averaged around the circumference of the lens. $P_S$ shows little variation across the central zone 905, and similar to FIGS. 12 and 14, at the annular region, the $P_S$ variation is a ramp starting from a negative add power at the inner edge of the annular region 903 and increasing with increasing radius either side of the centre of the lens to a positive add power at the outer edge of the annular region 903. The average $P_S$ curve (dotted curve 931) is symmetrical about the centre of the lens (the radius value 0). The dashed solid curve 933 shows $P_S$ taken along a vertical line V-V (shown in FIG. 15). This line intersects the maximum add power meridian 903a at θ=0 and passes through the intermediate add power meridian at θ=180 903b. As these meridians have different add powers, the solid curve 933 is asymmetrical about the centre of the lens, showing a greater ramp along the maximum add power meridian 903a at θ=0° and a shallower ramp at θ=180°. A curve taken along a horizontal line (H-H) shown in FIG. 15 cannot be seen in FIG. 16, because it coincides with the average $P_S$ curve.

Figure 17:
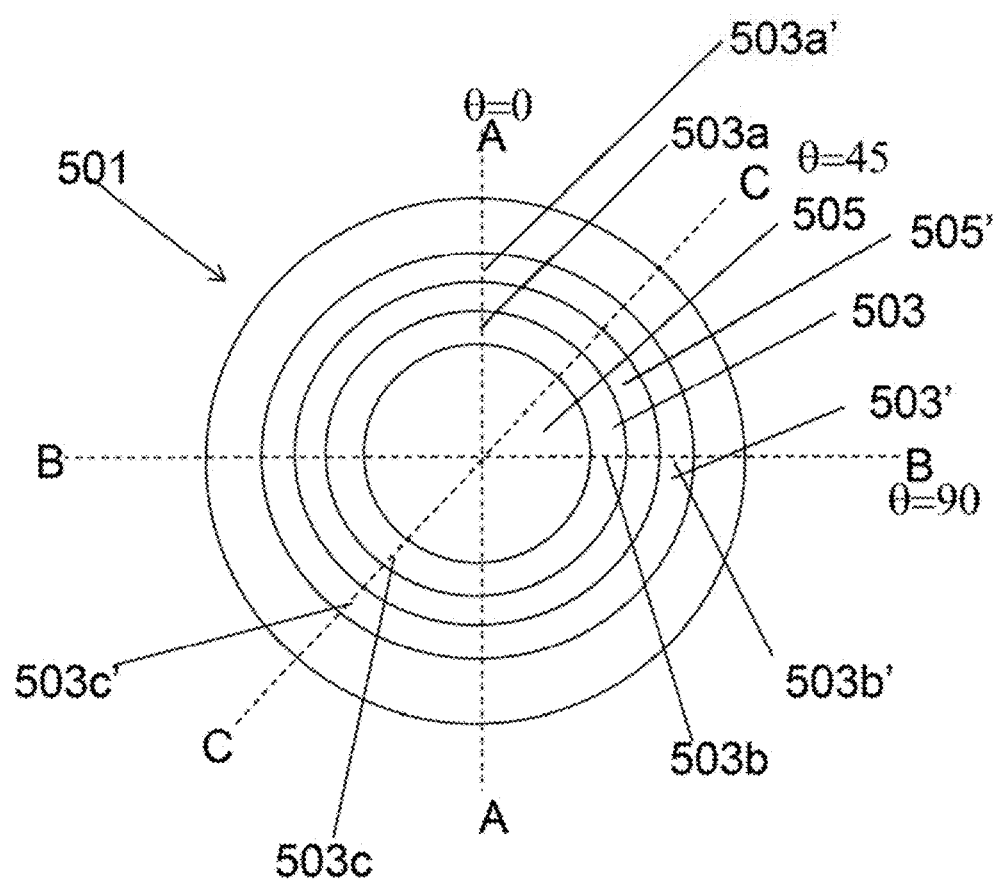
FIG. 17 is a top view of a lens having two annular regions according to an embodiment of the disclosure.
Figure 18:
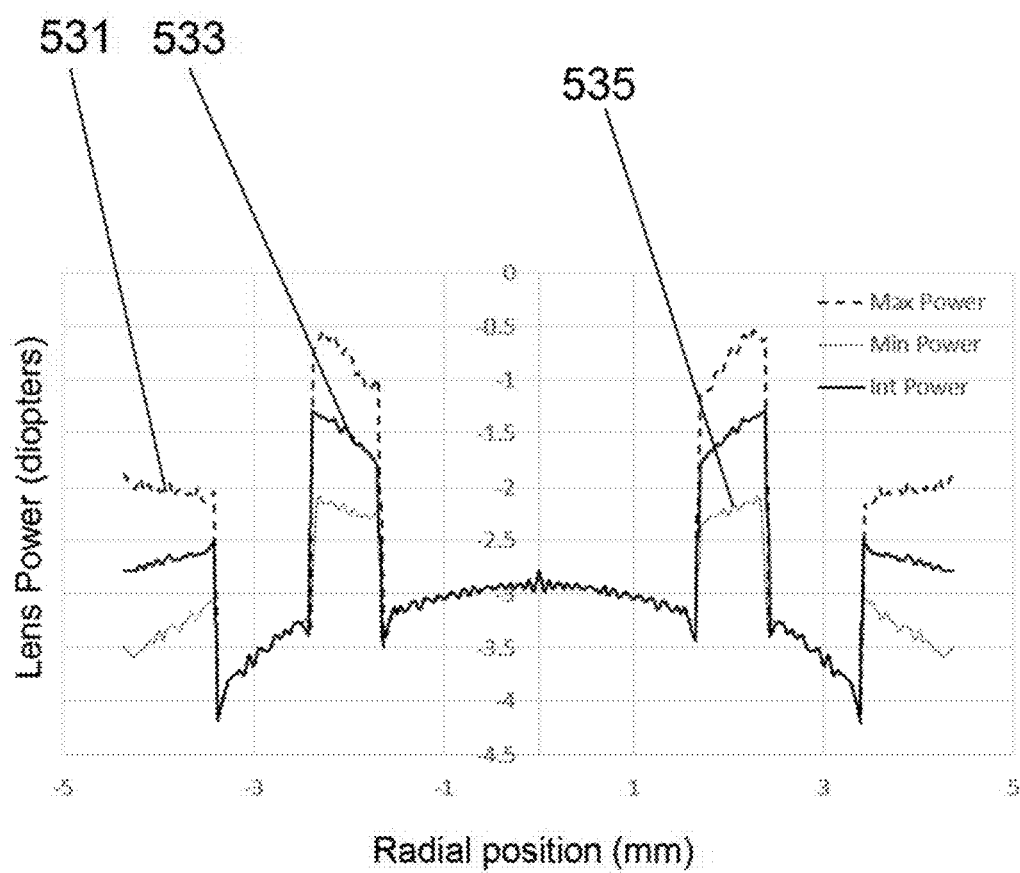
FIG. 18 is a plot showing variation in curvature based power for the lens shown in FIG. 17.

FIG. 17 shows a lens 501 according to an embodiment of the present disclosure. The lens 501 has a central zone 505, two annular zones 503, 503' separated by a further zone 505' having the base power and a nominal power of −7 D. FIG. 18 shows $P_C$ for this lens 501 for two different values of θ. For the line A-A, which corresponds to $θ_1$=0° and the dashed curve 531 and a maximum add power region 503a/503a', the curvature-based power is significantly less negative in the annular regions 503a and 503a', which shows the add power effect of the annular region 503a/503a' compared to the central region 505. The line C-C corresponds to $θ_2$=45, the solid curve 533 and an intermediate add power region 503c/503c'. The difference between the curvature-based power of the central region 505 and the annular regions 503c and 503c' is smaller than it is along the line A-A, and hence the add power is less. The line B-B corresponds to $θ_3$=90 and the black dashed curve 535, and a minimum add power for the annular region 503b/503b'. For this lens, the minimum add power is non-zero.

Figure 19:
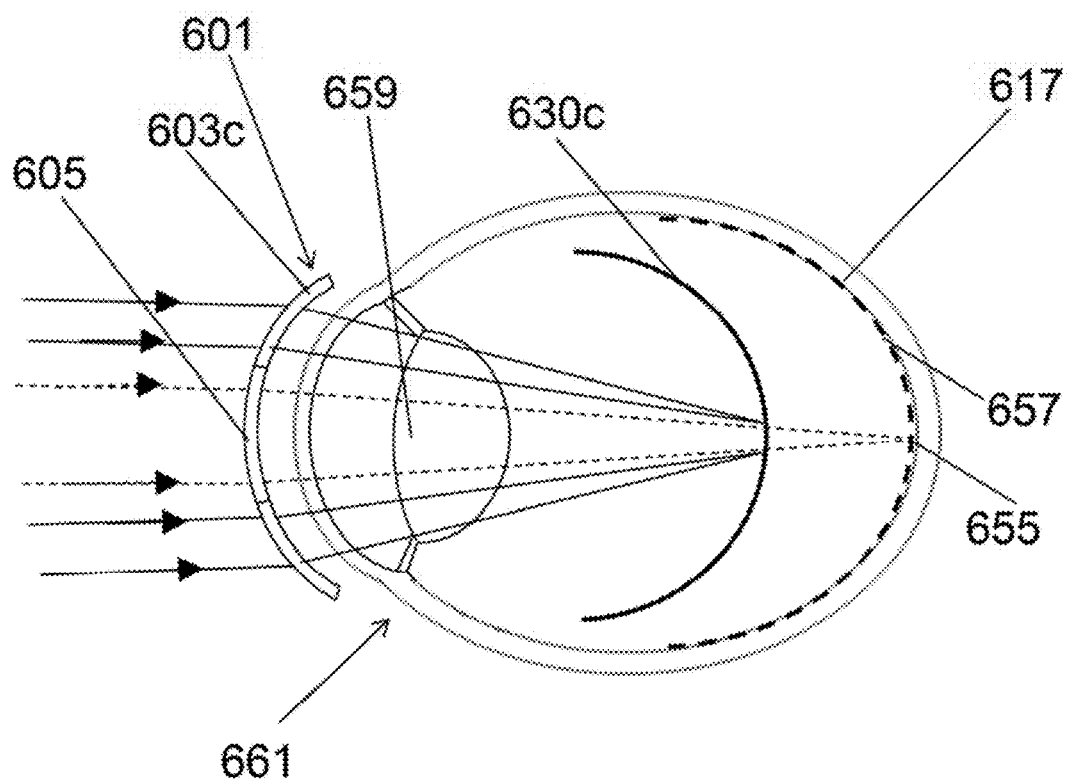
FIG. 19 shows a lens according to an embodiment of the disclosure on an eye.

As shown in FIG. 19, whilst FIGS. 5B, 5C, 6A, 6C, 7A-7C, 10 and 11B show flat focal surfaces, as discussed above, in reality, these image surfaces will be curved image "shells" as a result of a lens 601 working in conjunction with the natural lens 659 of the eye 661. The distal focal surface 617 is a curved surface that that substantially coincides with the retina 657. FIG. 19 shows light rays intersecting the lens 601 along a line C-C, which is a line along θ=45°, and corresponds to an intermediate add power-region 603c of the lens 601. At an intermediate add power focal surface 630c, light rays from a point source at infinity that intersect the lens along a line C-C, and pass through the central region 605 are not in focus, whereas light rays from a distant point source intersecting the lens along a line C-C and passing through the annular region 603c are in focus; however, as light intersecting the lens along other meridians and passing through the annular region 603c is not in focus, a single image is not formed at the intermediate add power focal surface 630c. As a result of the varying add power of the annular region 603a of the lens 601, different areas of the retina 657 will be exposed to different levels of defocus. Regarding FIG. 19 and FIG. 20A-C, references to the lines A-A, B-B and C-C relate to the corresponding lines that are shown in the previous Figures (see FIG. 13 and FIG. 17).

In the embodiments of the present disclosure shown in the figures, the lenses all have at least one maximum add power meridian, at least one base power meridian, and at least one intermediate add power meridian between the maximum add power meridians and the base power meridians. In other embodiments, the lens may not have a base power meridian.

In the embodiments of the present disclosure described above, maximum add power regions coincide with a line along θ=0° and zero add power regions coincide with a line along θ=90°. The add power varies in a continuous sinusoidal manner, as shown in FIG. 20B, and therefore has intermediate values in between the lines A-A and B-B. In other embodiments, the add power may vary with θ in a stepwise manner, as shown in FIG. 20A, or as a sawtooth function, as shown in FIG. 20C.

Figure 20A:
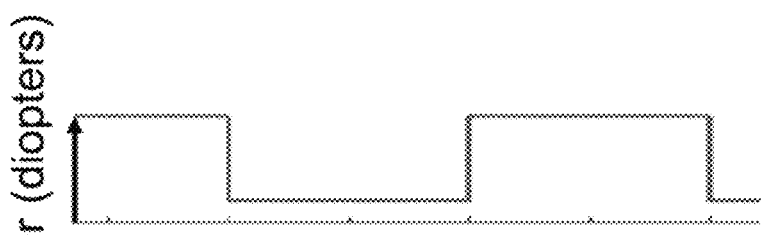
FIG. 20A is a plot showing stepwise variation in add power with θ, for lenses according to embodiments of the disclosure.
Figure 20B:
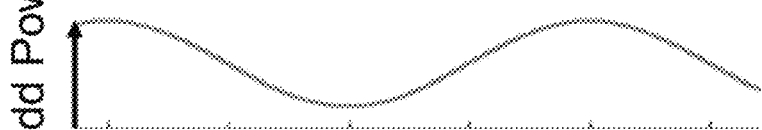
FIG. 20B is a plot showing continuous sinusoidal variation in add power with θ, for lenses according to embodiments of the disclosure.
Figure 20C:
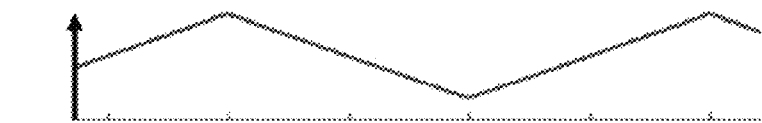
FIG. 20C is a plot showing a saw-tooth variation in add power with θ, for lenses according to embodiments of the disclosure.
Figure 21A:
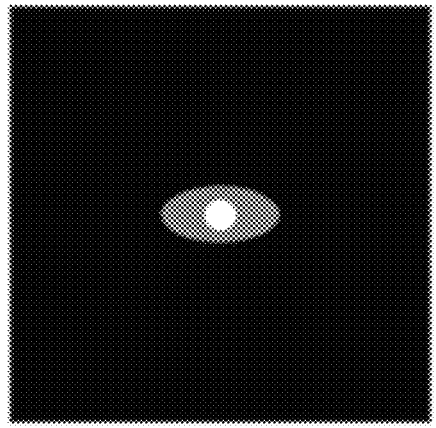
FIG. 21A shows a light pattern formed by light from a distant point source at a distal focal surface of a lens according to an embodiment of the present disclosure, the lens having maximum add power every 180°.
Figure 21B:
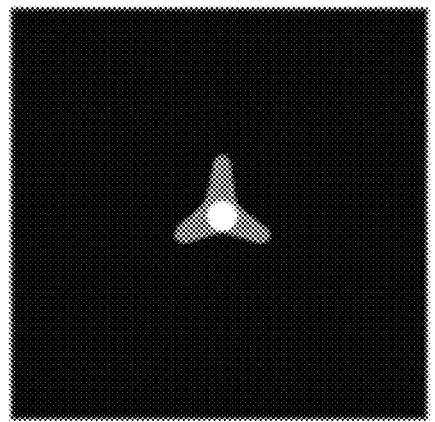
FIG. 21B shows a light pattern formed by light from a distant point source at a distal focal surface of a lens according to an embodiment of the present disclosure, the lens having maximum add power every 60°.
Figure 21C:
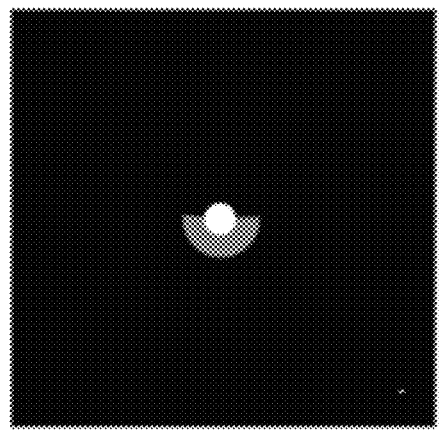
FIG. 21C shows a light pattern formed by light from a distant point source at a distal focal surface, for a lens according to an embodiment of the present disclosure, the lens having a single maximum add power meridian that spans 180°, and narrow intermediate add power meridians that form a smooth boundary to base power meridian.
Figure 21D:
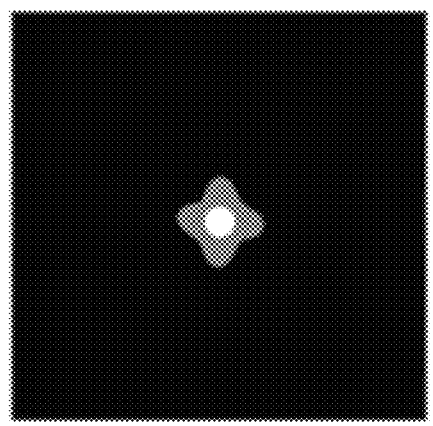
FIG. 21D shows a light pattern formed by light from a distant point source at a distal focal surface for a lens according to an embodiment of the present disclosure, the lens having maximum add power every 90°.

The period of the variation in add power may also vary, for example maxima in the add power may occur every 45°, every 30° or every 20°, corresponding to different integer values of n in FIGS. 20A-C. FIGS. 21A-D show blur patterns produced at a distal focal surface by light rays from a distant point source intersecting a lens and passing through the annular region for lenses according to embodiments of the present disclosure. FIG. 21A shows the blur pattern for a lens that has a maximum add power every 180 degrees. FIG. 21B shows the blur pattern for a lens that has a maximum add power every 60°. FIG. 21C shows the blur pattern for a lens that has a maximum add power meridian that spans 180°. The remainder of the annular region has the base power, and narrow intermediate add power meridians smooth the boundary between the maximum add power meridian and the base power region. FIG. 21D shows the blur pattern for a lens that has a maximum add power meridian every 90°.

Figure 22A:
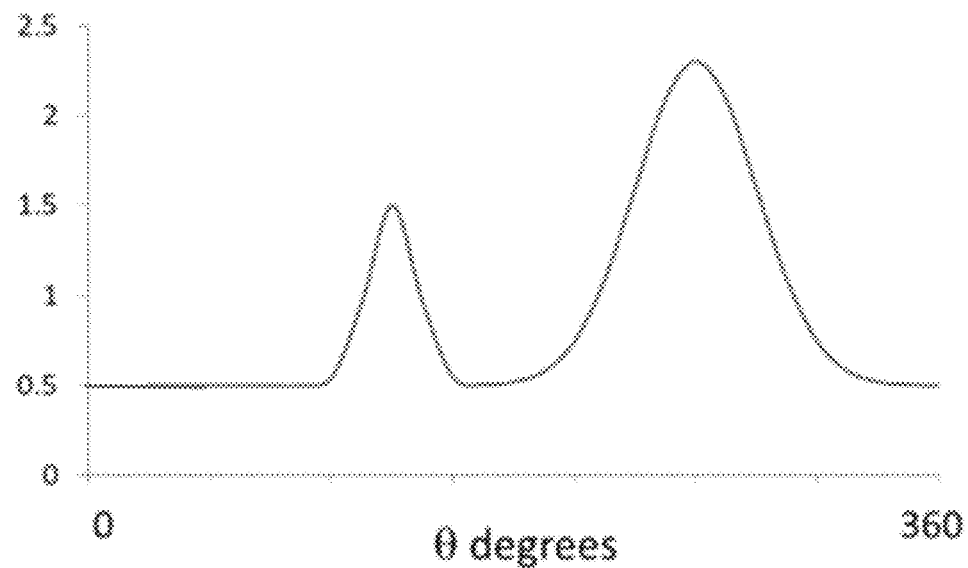
FIG. 22A is a plot showing variation in power with θ for a lens according to an embodiment of the present disclosure, the lens having two maximum add power meridians that have different powers.
Figure 22B:
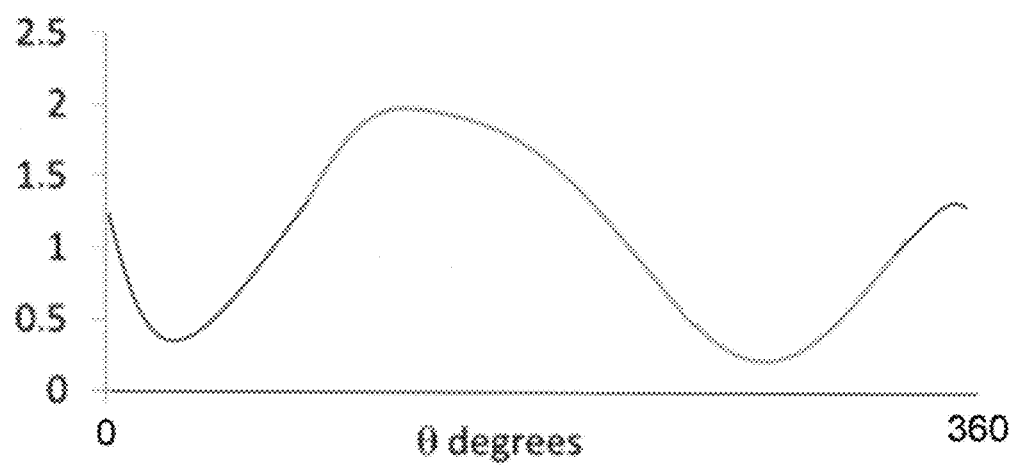
FIG. 22B is a plot showing variation in power with θ for a lens according to an embodiment of the present disclosure, the lens having a maximum add power meridian with an asymmetric peak profile, according to embodiments of the present disclosure.

In the embodiments of the present disclosure described above, when a plurality of maximum add power meridians are present, they occur at regular intervals around the circumference of the annular region. In other embodiments, maximum add power meridians may be irregularly spaced around the circumference of the lens. Each of the plurality of maximum add power meridians may have a different power, as shown in FIG. 22A. As shown in FIG. 22B maximum add power meridians may have asymmetrical power profiles.

Embodiments of the present disclosure also provide a contact lens for use in preventing or slowing the development or progression of myopia. The lens includes an optic zone comprising a central region, the central region having a first optical axis and a base power which focuses light to a focal point that is on the first optical axis. The lens includes an annular region, wherein the annular region surrounds the central region and comprises at least one maximum add power meridian providing a maximum add power and focusing light to a plurality of focal points that are a first distance from the first optical axis. The lens includes at least one intermediate add power meridian providing an intermediate add power of between zero dioptres of add power and the maximum add power that focuses light to a plurality of focal points that are at a different distance from the optical axis than the first distance.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:

1. A contact lens for use in preventing or slowing the development or progression of myopia, the lens including an optic zone comprising:
   a central region, the central region having a first optical axis and a curvature providing a base power and centred on a centre of curvature that is on the first optical axis; and
   an annular region having an add power, wherein the annular region surrounds the central region, is tilted relative to the central region, and comprises:
      at least one maximum add power meridian having a curvature providing a maximum add power and centred on a centre of curvature that is a first distance from the first optical axis; and
      at least one intermediate add power meridian having a curvature providing an intermediate add power of between zero dioptres of add power and the maximum add power and centred on a centre of curvature that is at a different distance from the optical axis than the first distance, wherein the add power of the annular region varies continuously between the at least one maximum add power meridian and the at least one intermediate add power meridian.

2. The contact lens according to claim 1, wherein the annular region further comprises at least one base-power meridian, having the curvature providing the base power and centred on the centre of curvature of the central region.

3. The contact lens according to claim 1, wherein the curvatures providing the base power, the maximum add power, and the intermediate add power are curvatures of the anterior surface of the lens.

4. The contact lens according to claim 1, wherein the annular region is tilted relative to the central region such that the lens has a sagittal power at the midpoint of the at least one maximum add power meridian that matches the power that the central region would have if it were extended out to that midpoint.

5. The contact lens according to claim 1, wherein the annular region comprises a periodic arrangement of maximum add power meridians separated by intermediate add power meridians.

6. The contact lens according to claim 5, wherein the power of the annular region varies in a sinusoidal, stepwise, triangular or sawtooth manner around the circumference of the annular region.

7. The contact lens according to claim 1, wherein the central region is substantially circular in shape and has a diameter of between 2 and 7 mm.

8. The contact lens according to claim 1, wherein the annular region extends radially outwards from a perimeter of the central region by between 0.5 and 1.5 mm.

9. The contact lens according to claim 1, wherein the base power is between 0.5 and −15.0 diopters.

10. The contact lens according to claim 1, wherein the maximum add power meridian of the annular region has an add power of between +0.5 and +10.0 diopters.

11. The contact lens according to claim 1, comprising at least two concentric annular regions, wherein each of the annular regions comprises at least one maximum add power meridian having a curvature providing a maximum add power and centred on a centre of curvature that is a first distance from the optical axis, and at least one intermediate add power meridian having a curvature providing an intermediate add power of between zero dioptres of add power and the maximum add power and centred on a centre of curvature that is at a different distance from the optical axis than the first distance.

12. The contact lens according to claim 1, wherein the lens comprises an elastomer material, a silicone elastomer material, a hydrogel material, or a silicone hydrogel material, or mixtures thereof.

13. The contact lens according to claim 1, wherein the lens is a molded contact lens.

14. A method of manufacturing a contact lens according to claim 1, the method comprising:
    forming a contact lens, wherein the lens comprises:
        a central region, the central region having a base power; and
        an annular region having an add power, wherein the annular region surrounds the central region, is tilted radially relative to the central region, and comprises:
            at least one maximum add power meridian having a curvature providing a maximum add power and centred on a centre of curvature that is a first distance from the first optical axis; and
            at least one intermediate add power meridian having a curvature providing an intermediate add power of between zero dioptres of add power and the maximum add power and centred on a centre of curvature that is at a different distance from the optical axis than the first distance, wherein the add power of the annular region varies continuously between the at least one maximum add power meridian and the at least one intermediate add power meridian.

15. A method of reducing progression of myopia, comprising:
    providing a contact lens according to claim 1 to a myopic person who is able to accommodate for varying near distances.

* * * * *